United States Patent
Honda

(10) Patent No.: US 9,235,791 B2
(45) Date of Patent: Jan. 12, 2016

(54) IMAGE PROCESSING APPARATUS

(71) Applicant: Oki Data Corporation, Tokyo (JP)

(72) Inventor: Noriyuki Honda, Tokyo (JP)

(73) Assignee: OKI DATA CORPORATION, Tokyo (JP)

( * ) Notice: Subject to any disclaimer, the term of this patent is extended or adjusted under 35 U.S.C. 154(b) by 0 days.

(21) Appl. No.: 14/495,964

(22) Filed: Sep. 25, 2014

(65) Prior Publication Data

US 2015/0092245 A1 Apr. 2, 2015

(30) Foreign Application Priority Data

Sep. 27, 2013 (JP) ................................. 2013-200766

(51) Int. Cl.
- *H04N 1/405* (2006.01)
- *G06K 15/02* (2006.01)
- *H04N 1/46* (2006.01)

(52) U.S. Cl.
CPC ........ *G06K 15/1872* (2013.01); *G06K 15/1822* (2013.01); *H04N 1/46* (2013.01)

(58) Field of Classification Search
CPC . H04N 1/2032; H04N 1/1215; H04N 1/4095; H04N 1/00045; B41J 2029/3935; B41J 2202/11; B41J 2/2117; B41M 5/42; B41M 2205/34
USPC ......... 358/1.9, 1.18, 3.26, 463, 504; 382/275; 347/175, 100; 400/188
See application file for complete search history.

(56) References Cited

U.S. PATENT DOCUMENTS

| 7,646,509 B1 | 1/2010 | Nagarajan et al. |
| 2005/0262809 A1 | 12/2005 | Tada et al. |
| 2005/0280692 A1* | 12/2005 | Kim et al. ..................... 347/215 |
| 2010/0201729 A1 | 8/2010 | Falser et al. |
| 2012/0081461 A1 | 4/2012 | Kakutani |
| 2013/0003084 A1* | 1/2013 | Hirose ........................... 358/1.2 |
| 2014/0313526 A1* | 10/2014 | Davidson ....................... 358/1.6 |

FOREIGN PATENT DOCUMENTS

| JP | 2003-182203 A | 7/2003 |
| JP | 2004-243710 A | 9/2004 |

* cited by examiner

Primary Examiner — Thomas D Lee
Assistant Examiner — Stephen M Brinich
(74) Attorney, Agent, or Firm — Rabin & Berdo, P.C.

(57) ABSTRACT

A light-blocking object processing section produces first and second light-blocking objects to be formed on the front and back surfaces of a print medium, respectively. A first image object is formed on the first light-blocking object and a second image object is formed on the second light-blocking object. If the first and second image objects should be formed in first and second areas, respectively, and the first and second areas defining an overlapping area in which the first image object overlaps the second image object, then the light-blocking object processing section performs one of a first process in which the thickness of the first and second light-blocking objects is smaller in the overlapping area than in a third area outside the overlapping area and a second process in which one of the first and second light-blocking objects is not formed.

13 Claims, 19 Drawing Sheets

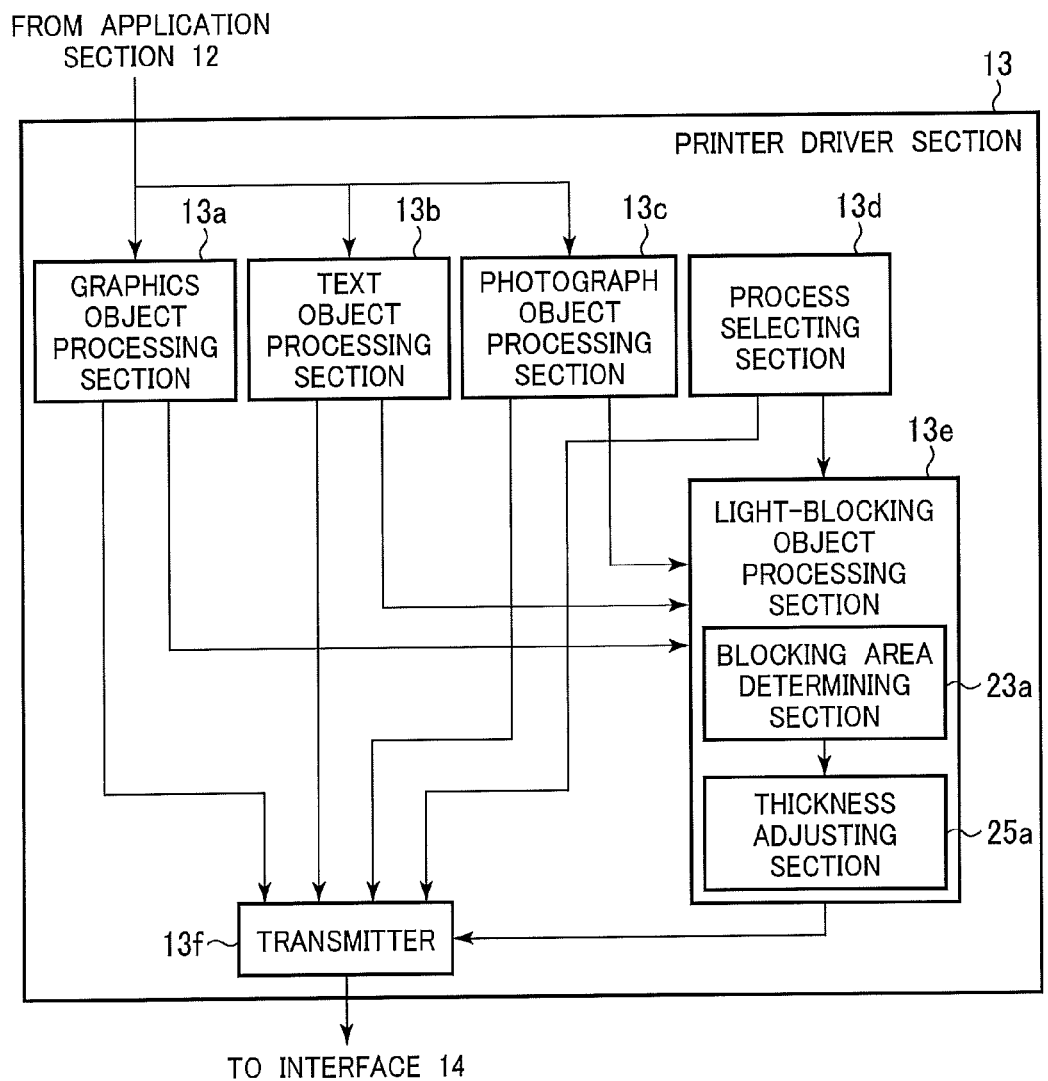

CROSS-HATCHED AREA
IS MISSING FROM
LIGHT-BLOCKING OBJECT 52a

CROSS-HATCHED AREA
IS MISSING FROM
LIGHT-BLOCKING OBJECT 52b

IMAGE PROCESSING APPARATUS

BACKGROUND OF THE INVENTION

1. Field of the Invention

The present invention relates to an image processing apparatus.

2. Description of the Related Art

Conventional image forming apparatus including electrophotographic printers, ink jet printers, copying machines, and facsimile machines use color toners or color inks to print an image on a print medium such as print paper.

Print results can suffer from a phenomenon referred to as "show-through" in which images printed on one of major surfaces of a paper sheet may be seen through the other of the major surfaces of the same sheet, depending on the type and thickness of the paper sheet. Japanese patents Laid-open No. 2003-182203 and No. 2004-243710 have proposed techniques in which a light blocking agent is applied to the one surface of the print medium or both surfaces to form a uniform light-blocking object or coating having a predetermined thickness, thereby preventing "show-through."

However, if the light-blocking object is formed on both surfaces of the print paper, a large amount of the light blocking agent is required.

SUMMARY OF THE INVENTION

An object of the invention is to solve the aforementioned drawbacks of conventional art image forming apparatus.

Another object of the invention is to provide an image forming apparatus in which a light-blocking object is formed on at least one of the front and back surfaces of a print medium or a light-blocking object is thicker when the light-blocking object is formed only on one of the front and back surfaces of a print medium than when light-blocking objects are formed on both front and back surfaces of the print medium, thereby preventing "show-through" and saving the amount of light blocking agent.

An image data processing apparatus includes a light-blocking object processing section. A light-blocking object processing section produces first and second light-blocking objects to be formed on the front and back surfaces of a print medium, respectively. A first image object is formed on the first light-blocking object and a second image object is formed on the second light-blocking object. If the first and second image objects should be formed in first and second areas, respectively, and the first and second areas defining an overlapping area in which the first image object overlaps the second image object, then the light-blocking object processing section performs one of a first process in which the first and second light-blocking objects include a thickness smaller in the overlapping area than in a third area outside the overlapping area and a second process in which one of the first and second light-blocking objects is not formed.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limiting the present invention, and wherein:

FIG. 2B illustrates the configuration of a printer driver section of the host apparatus;

FIG. 9B illustrates the functions of the printer driver section of a host apparatus;

FIG. 9C illustrates the functions of the printer driver section of the image forming apparatus according to the third embodiment;

DETAILED DESCRIPTION OF THE INVENTION

Embodiments of the present invention will be described in detail with reference to the accompanying drawings.

First Embodiment

Figure 1:
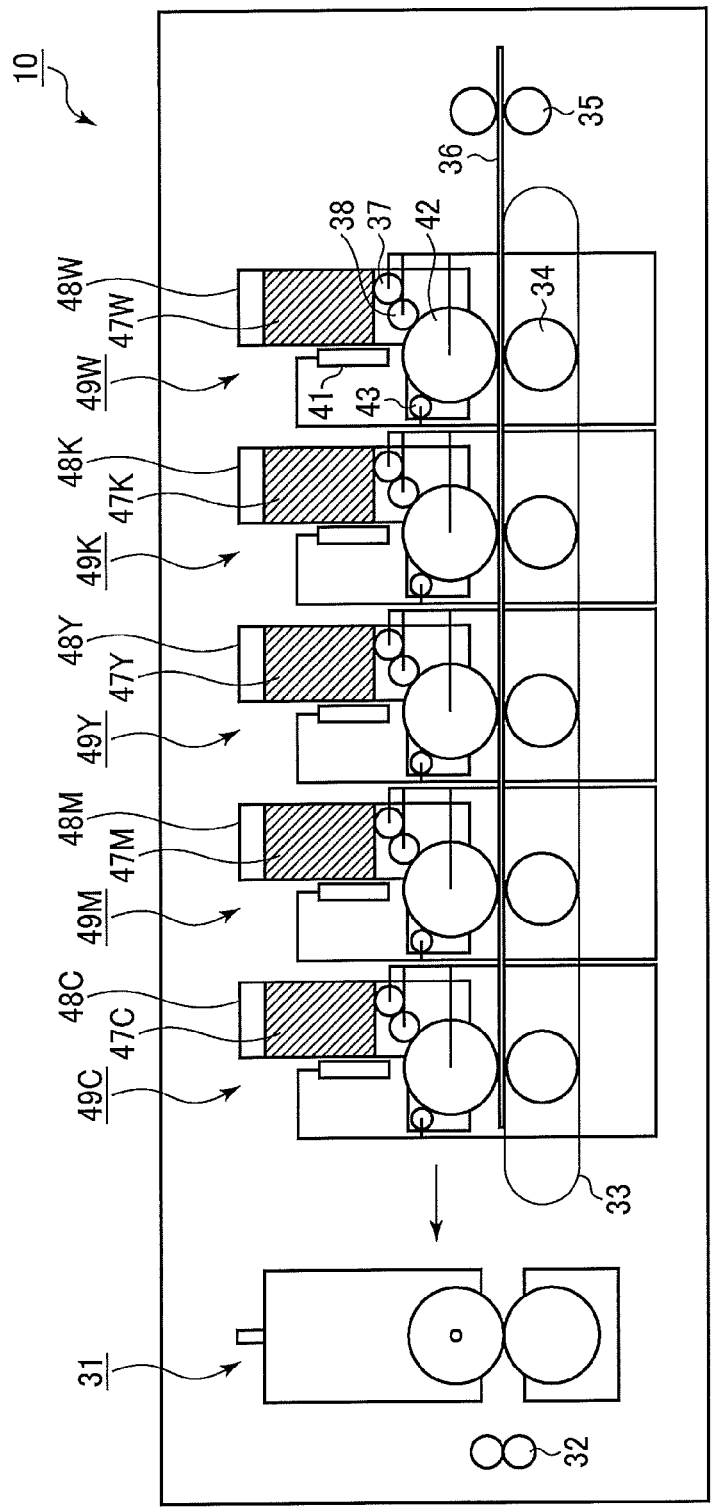
FIG. 1 illustrates the outline of an image forming apparatus according to a first embodiment.

FIG. 1 illustrates the outline of an image forming apparatus according to a first embodiment.

An image forming apparatus 10 takes the form of, for example, a printer, a facsimile machine, copying machine, or a multi-function printer that is able to work as a fax machine, a scanner, a photocopier, and a printer. The image forming apparatus may be any type of image forming apparatus that utilizes, for example, ink jet printing, electrophotographic printing, or thermal transfer printing method. The present invention will be described in terms of a tandem color electrophotographic printer.

Print engines 49W, 49K, 49Y, 49M and 49C are aligned along the transport path of a print medium 36 in a direction in which the print medium 36 is transported, and form white, black, yellow, magenta, and cyan images, respectively, on the print medium 36.

The print engines 49W, 49K, 49Y, 49M, and 49C have developer holding chambers 48W, 48K, 48Y, 48M, and 48C, which hold toners or developer materials 47W, 47K, 47Y, 47M, and 47C therein, respectively.

The print engines 49W, 49K, 49Y, 49M, and 49C have the same construction and differ only in the color of toner held therein. Each of the print engines 49W, 49K, 49Y, 49M, and 49C includes a photoconductive drum 42, a charging roller 43, and an LED (light emitting diode) head 41, a developing roller 38, and a developer supplying roller 37. The photoconductive drum 42 bears a developer image formed thereon, and is rotatable about a shaft thereof. The charging roller 43 rotates in contact with the photoconductive drum 42 and uniformly charges the circumferential surface of the photoconductive drum 42. The LED head 41 illuminates the charged surface of the photoconductive drum 42 to form an electrostatic latent image on the photoconductive drum 42. The developing roller 38 rotates about a shaft thereof in contact with the photoconductive drum 42 to supply the developer materials 47W, 47K, 47Y, 47M, or 47C to the electrostatic latent image on the photoconductive drum 42. The developer supplying roller 37 rotates to supply the developer material 47W, 47K, 47Y, 47M, or 47C to the developing roller 38.

The white developer material 47W, is used to print a uniform coating or light-blocking object 52a and/or 52b (FIGS. 3A-3C) on the front surface and/or the back surface of the print medium 36. The print engine 49W serves as a light-blocking object forming section that forms the light-blocking object 52a and 52b. The light-blocking object 52a and 52b serve as light-blocking objects or a base on which an image object is printed. In the specification, the term light-blocking layer is synonymous with the term light-blocking object. The print engines 49K, 49Y, 49M, and 49C operate as image forming sections which form an image object of corresponding colors on the light-blocking object 52a or 52b printed on the front surface and/or back surface of the print medium 36.

The image forming apparatus 10 includes a belt unit that transports the print medium 36. The belt unit includes a transfer belt 33 disposed about a drive roller driven by a motor (not shown) in rotation, and transfer rollers 34 which face the photoconductive drums 42 of corresponding print engines 49K, 49Y, 49M, and 49C. When the transfer belt 33 runs, the print medium 36 on the transfer belt 33 passes through the transfer points defined between the photoconductive drums of the respective print engines and the corresponding transfer rollers. As the print medium 36 passes through the print engines 49K, 49Y, 49M, and 49C, images of corresponding colors are transferred onto the print medium 36.

A pair of feed rollers 35 is disposed upstream of the belt unit with respect to the direction of travel of the print medium 36. The pair of feed rollers 35 feeds the print medium 36, fed from a print medium feeding section (not shown), into the transfer unit. A fixing unit 31 is disposed downstream of the belt unit, and fixes the developer images formed on the print medium 36 by heat and pressure. A pair of discharging rollers 32 is disposed downstream of the fixing unit 31, and discharges the print medium 36 to the outside of the image forming apparatus 10.

When image forming apparatus 10 prints an image, the print medium 36 is fed from a medium holding section into the transport path. The print medium 36 is fed onto the transfer belt 33 by the pair of feed roller 35. The print medium 36 is then transported to the downstream end of the belt unit.

Developer images are formed on the respective photoconductive drums 42W, 42K, 42Y, 42M, and 42C. The developer images are transferred by the transfer rollers 34 onto the print medium 36 in sequence as the print medium 36 advances through the respective print engines 49W, 49K, 49Y, 49M, and 49C.

In the present embodiment, a white developer image of the white developer material 47W is first formed on the print medium 36. Black, yellow, magenta, and cyan images of black (K), yellow (Y), magenta (M), and cyan (C) developer materials, respectively, are then transferred onto the white developer image. In this manner, the developer images are formed so that the light-blocking object 52a or 52b of the white developer material 47W prevents "show-through."

After all of the developer images have been transferred onto the print medium 36, the print medium 36 passes through the fixing unit 31. As the print medium 36 passes through a fixing point defined between a heat roller and a pressure roller, the developer images of the respective colors are fused into the print medium 36. The print medium 36 is then discharged by the pair of discharging rollers 32 to the outside of the image forming apparatus 10.

The functional blocks of the image forming apparatus 10 will now be described.

Figure 2A:
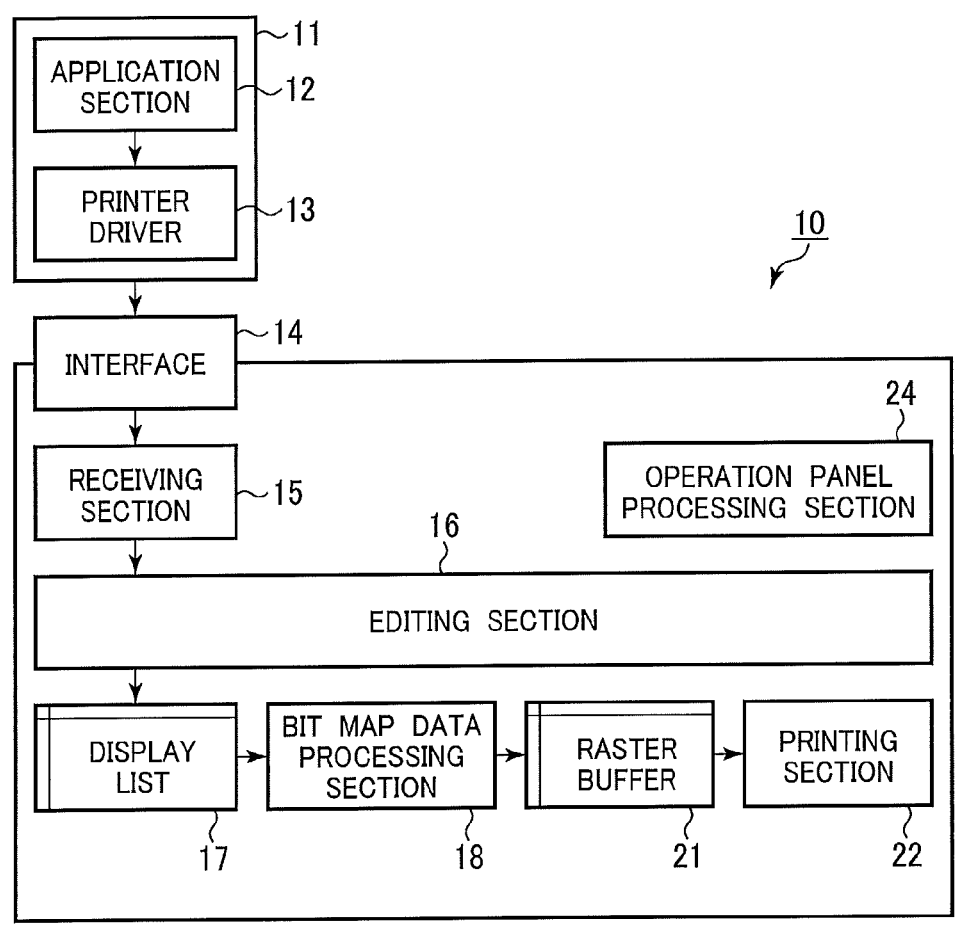
FIG. 2A is a block diagram illustrating the functions of a host apparatus and the image forming apparatus.

FIG. 2A is a block diagram illustrating the blocks of a host apparatus 11 and the image forming apparatus 10.

The image forming apparatus 10 is connected to a host apparatus 11 through a communication line including networks, and universal serial bus (USB) connection (not shown). The host apparatus 11 may be any type of apparatus as long as the host apparatus 11 is capable of producing print data and sending the print data to the image forming apparatus 10. The host apparatus 11 is, for example, a server, a personal digital assistant (PDA), an electronic organizer, a video game console, or a cellular phone. In the present invention, the host apparatus 11 takes the form of a personal computer equipped with an arithmetic operation unit such as a CPU or an MPU; a storage means such as a magnetic disk or a semiconductor memory; an inputting means such as a key board, a mouse, and a touch screen; and a display unit such as a CRT, a liquid display, and a communication interface.

{When Light-Blocking Object is Formed on Host Apparatus Side}

The host apparatus 11 includes an application section 12 on which applications run to produce the print data, and a printer driver section 13 on which software runs to control the operation of the image forming apparatus 10.

FIG. 2B illustrates the configuration of the printer driver section 13 of the host apparatus 11. The printer driver section 13 includes a graphics object processing section 13a, a text object processing section 13b, a photographic object processing section 13c, a process selecting section 13d, and a blocking object processing section 13e.

Based on the image data received from the application section 12, the graphics object processing section 13a produces image object data for a graphics object by editing the graphics data and performing color matching on the graphics data, and then outputs the graphics object to a transmitter 13f. The light-blocking object for the graphic object is then produced based on the thus produced image object data for the graphics object. The graphics object processing section 13a also outputs the print area in which the graphics object should be printed, to the blocking object processing section 13e.

Based on the image data received from the application section 12, the text object processing section 13b produces image object data for a text object by editing the text data, performs color matching on the text data, and outputs the text object to the transmitter 13f. The light-blocking object for the text object is then produced based on the thus produced image object data for the text object. The text object processing section 13b also outputs the print area of the text object in which the photographic object should be printed, to the blocking object processing section 13e.

Based on image data received from the application section 12, the photographic object processing section 13c produces image object data for a photographic object by editing the photograph data and performing color matching on the photograph, and then outputs the photographic object to the transmitter 13f. The light-blocking object for the photographic object is then produced based on the thus produced image object data for the photographic object. The photographic object processing section 13c also outputs the print area of the photographic object in which the photographic object should be printed, to the blocking object processing section 13e.

The process selecting section 13d accepts the selection made by a user: "the blocking object data is not to be processed", "the blocking object data is to be processed on the host apparatus side", and "the blocking object data is to be processed on the image forming apparatus side". The process selecting section 13d then drives the transmitter 13f to send information indicative of the selection made to the image forming apparatus 10.

When the blocking object processing section 13e receives the selection "the blocking object data is to be processed on the host apparatus side" from the process selecting section 13d, a blocking area determining section 23a determines the print area in which the light-blocking object 52a or 52b should be printed, the print area being determined based on the print areas received from the graphics processing section, text processing section, or photographic processing section. The blocking area determining section 23a then describes the determined print area in terms of coordinate range, thereby producing a light-blocking object. In the first embodiment, the print area to be covered by the light-blocking developer is the entire printable area on the front or back surface of the print medium 36.

The thickness adjusting section 25a makes a decision on whether the object in the print area should be printed in simplex mode or duplex mode. This decision is made based on the print area received from the graphics object processing section 13a, text object processing section 13b, or photographic object processing section 13c.

The thickness adjusting section 25a then adjusts the thickness of the light-blocking object 52a or 52b as a light-blocking object, and then adds the information to be printed to the light-blocking object.

The blocking object processing section 13e sends to the transmitter 13f the light-blocking object, produced by the blocking area determining section 23a and the thickness adjusting section 25a.

Upon reception of information "the blocking object is not to be processed" from the process selecting section 13d, the transmitter 13f converts the graphics object received from the graphics object processing section 13a, the text object received from the text object processing section 13b, and the photographic object received from the photographic object processing section 13c, into the print data. The transmitter then sends the thus produced print data to the image forming apparatus 10.

Upon reception of information "the blocking object data is to be processed on the image forming apparatus side" from the process selecting section 13d, the transmitter 13f converts into the print data the graphics object received from the graphics object processing section 13a, the text object received from the text object processing section 13b, and the photographic object received from the photographic object processing section 13c. The transmitter 13f then sends the thus produced print data together with information "blocking layer should be checked" to the image forming apparatus 10.

{When Light-Blocking Object is Formed on Image Forming Apparatus Side}

The image forming apparatus 10 includes the print engines 49W, 49K, 49Y, 49M, and 49C, the fixing unit 31, and the transfer belt 33. A controller (not shown) includes an arithmetic operation section and a memory. The image forming apparatus 10 further includes an interface 14, a receiving section 15, an editing section 16, a display list 17, a bit-map data processing section 18, a raster buffer 21, a printing section 22, and an operation panel processing section 24.

The interface 14 is connected to the host apparatus 11 via a communication network. The receiving section 15 receives from the host apparatus 11 a variety of types of data, and the print data including a variety of commands.

Figure 2C:
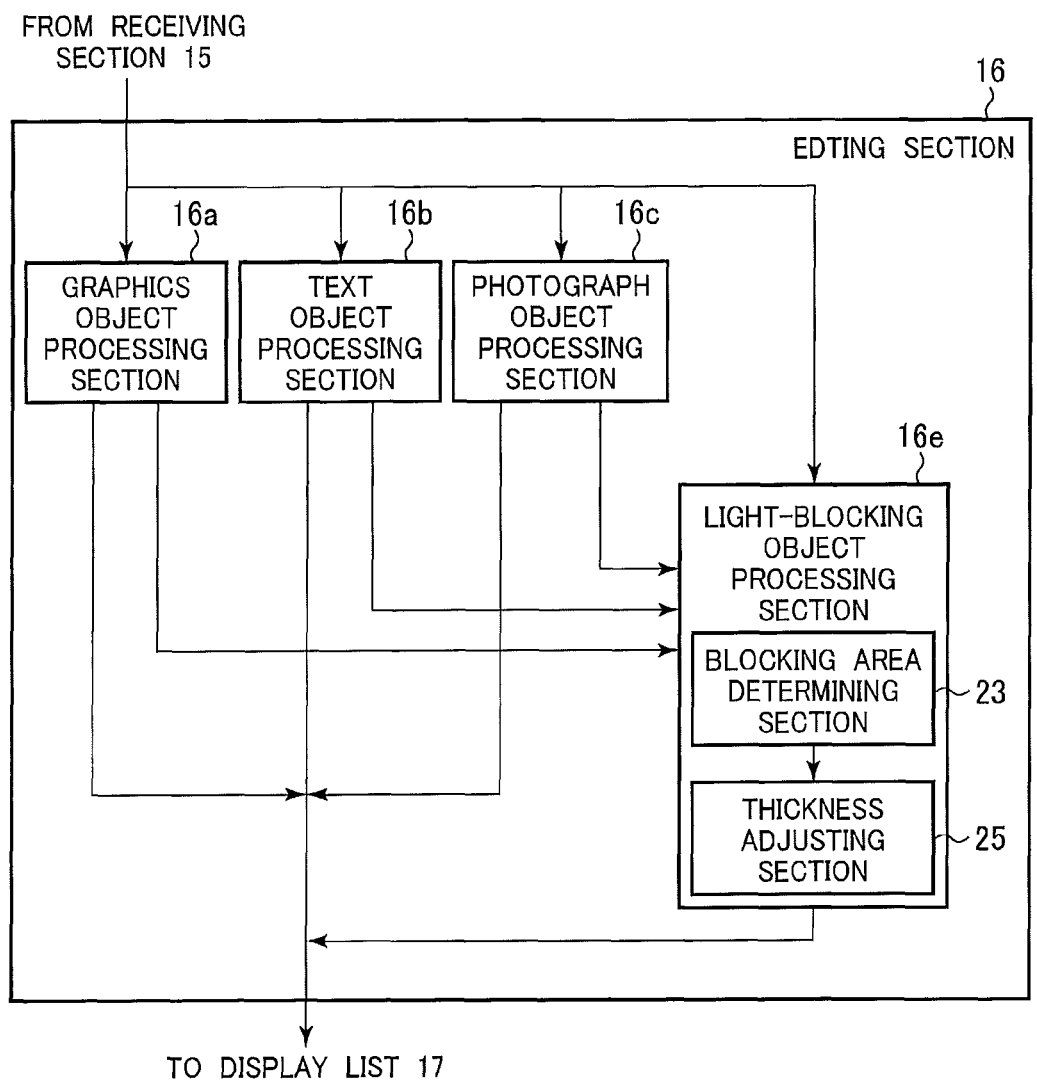
FIG. 2C illustrates the configuration of an editing section of the image forming apparatus.

FIG. 2C illustrates the configuration of the editing section 16 of the image forming apparatus 10. The editing section 16 decodes the print data received through the receiving section 15, thereby separating the print data into commands and data to be printed on a print medium. The editing section 16 includes a graphics object processing section 16a, a text object processing section 16b, a photographic processing section 16c, and a light-blocking object processing section 16e.

Based on the image data received from the receiving section 15, the graphics object processing section 16a edits the graphics object data, and performs color matching on the graphic object data, thereby producing image object data for the graphics object. The light-blocking object for the graphic object is then produced based on the thus produced image object data for the graphics object. The graphics object processing section 16a then converts the results of edition and color matching into an intermediate code, and outputs the print area for the graphics object to the light-blocking object processing section 16e.

Based on the image data received from the receiving section 15, the text object processing section 16b edits the text object data, and performs color matching on the graphic object data, thereby producing image object data for the text object. The light-blocking object for the text object is then produced based on the thus produced image object data for the text object. The text object processing section 16b then converts the results of edition and color matching into an intermediate code, and outputs the print area for the text object to the light-blocking object processing section 16e.

The photographic processing section 16c edits the photographic object data and performs color matching on the photographic object data based on the image data received from the receiving section 15, thereby producing image object data for the photographic object. The light-blocking object for the photographic object is then produced based on the thus produced image object data for the photographic object. The photographic processing section 16c then converts the results of edition and color matching into an intermediate code, and outputs the print area for the photographic object to the light-blocking object processing section 16e.

The light-blocking object processing section 16e edits the light blocking object data, and performs color matching based on the image data received from the receiving section 15. The light blocking object processing section 16e then converts the results of edition and color matching into an intermediate code, and outputs the print area for a blocking object to the display list 17.

The blocking area determining section 23a determines the print area in which the light-blocking object 52a or 52b should be printed, the print area being determined based on the print areas received from the graphics processing section 16a, text processing section 16b, and photographic processing section 16c. The blocking area determining section 23 then describes the print area in terms of coordinate range, thereby producing the light-blocking object. In the first embodiment, the print area to be covered by the light-blocking object is the entire printable area on the front and back surfaces of the print medium 36. A thickness adjusting section 25 makes a decision on whether the object in the print area should be printed in simplex mode or duplex mode. This decision is made based on the instructions contained in the print data received through the receiving section 15 or a setting selected by the user from the menu through the operation panel processing section 24. The thickness adjusting section 25 then adjusts the thickness of the light-blocking object 52a or 52b as a light-blocking object and then adds the information about the thickness of the light-blocking object 52a or 52b to the light-blocking object. The term object covers the light-blocking object and an image object. The image object includes graphics, text, photograph, which are to be printed on the print medium 36. The objects are printed on the front surface or the back surface of the print medium 36 with the developer materials 47W, 47K, 47Y, 47M, and 47C.

The editing section 16 determines the position in which the decoded data should be printed, and then selects the font for the decoded print data, and finally converts the decoded print data into intermediate code before storing into a display list 17.

When the receiving section 15 receives the print data together with the information indicative that a light-blocking object determining process should be performed or when the user selects a setting, which indicates that light-blocking object determining process should be performed, from the menu through the operation panel processing section 24, the blocking area determining section 23 determines the print area in which the light-blocking object 52a or 52b should be printed, and then stores therein the print area in terms of the ordinate range. In the first embodiment, the print area is the entire printable area on the front surface and/or the back surface of the print medium 36. The thickness adjusting section 25 makes a decision on whether the print data should be printed in simplex mode or duplex mode, the decision being made based on the instructions contained in the print data received in the receiving section 15 or on the setting selected by the user from the menu through the operation panel processing section 24. The thickness adjusting section 25 then adjusts the thickness of the light-blocking object 52a or 52b as a light-blocking object, and stores the print information for the light-blocking object 52a or 52b into the display list 17.

When the receiving section 15 receives the print data with the information indicative that a light-blocking object determining process should not be performed, when the received print data does not have the information indicative that the light-blocking object determining process should be performed, or when the setting indicative that the light-blocking object determining process should be performed has not been specified by the user from the menu through the operation panel processing section 24, if the print data contains the print information about the light-blocking object 52a or 52b, the blocking area determining section 23 stores the print information into the display list 17 and does not produce a new light-blocking object.

The bit-map data processing section 18 reads font data from, for example, the print data, which has been converted into the intermediate code and held in the display list 17. The bit-map data processing section 18 then renders the print data into raster data (bit map image) which can actually be printed, and then stores the raster data into the raster buffer 21.

The printing section 22 drives the print engines 49K, 49Y, 49M, and 49C to operate, thereby printing the print data which has been converted into the raster data and held in the raster buffer 21. The printing section 22 also drives the print engine 49W as a light-blocking object forming section that prints the light-blocking object 52a or 52b on the print medium 36.

The operation panel processing section 24 controls an operation panel (not shown) mounted on the body of the image forming apparatus 10. The operation panel includes a display unit implemented with, for example, a light emitting diode (LED) panel or a liquid crystal display (LCD). The display unit displays the status of the image forming apparatus 10. The user operates the switches on the operation panel, thereby selecting a preferred selection from the menu selections.

A description will be given of the operation for the image forming apparatus 10 with the aforementioned configuration, in terms of the thickness adjustment of the light-blocking object 52a and/or 52b.

Figure 3A:
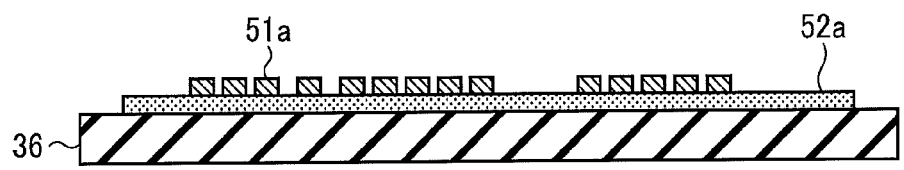
FIG. 3A is a cross-sectional view illustrating an image object and a light-blocking object formed on the front surface of a print medium.

FIG. 3A is a cross-sectional view illustrating an image object 51a and a light-blocking object 52a formed on the front surface of the print medium 36.

Referring to FIG. 3A, the black, yellow, magenta, and cyan images are formed as objects one over the other in registration on the light-blocking object 52a of the white developer 47W, thereby creating the image object 51a on the light-blocking object 52a. The light-blocking object 52a serves as a base layer and has a thickness of T, which is thick enough for the print results on the medium 36 to be free from "show-through." The light-blocking object 52a is printed with the white developer material 47W on the entire surface of the print medium 36, and prevents "show-through" of the image object 51a.

Figure 3B:
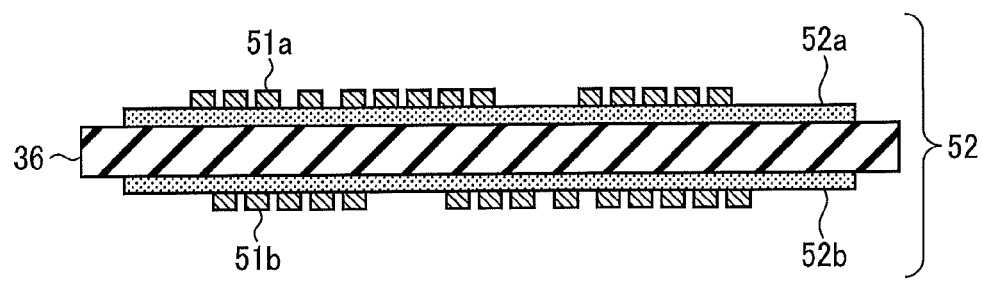
FIG. 3B is a cross-sectional view illustrating the image object and light-blocking object formed on the front surface of the print medium 36 and another image object and another light-blocking object formed on the back surface of the print medium.

FIG. 3B is a cross-sectional view illustrating the image object 51a and light-blocking object 52a formed on the front surface of the print medium 36, and an image object 51b and the light-blocking object 52b formed on the back surface of the print medium 36. It is to be noted that the images are printed on both front and back surfaces of the print medium 36. The images are printed just as in the images printed only on the front surface (FIG. 3A). The front image object 51a including black, yellow, magenta, and cyan images is formed over a front light-blocking object 52a formed on the front surface of the print medium 36, and the back image object 51b including black, yellow, magenta, and cyan images is formed over the back light-blocking object 52b formed on the back surface of the print medium 36. The light-blocking objects 52a and 52b shown in FIG. 3B have the same thickness as the light-blocking object 52a shown in FIG. 3A. The light-blocking objects 52a and 52b are formed on the entire front and back surfaces of the print medium 36.

Figure 3C:
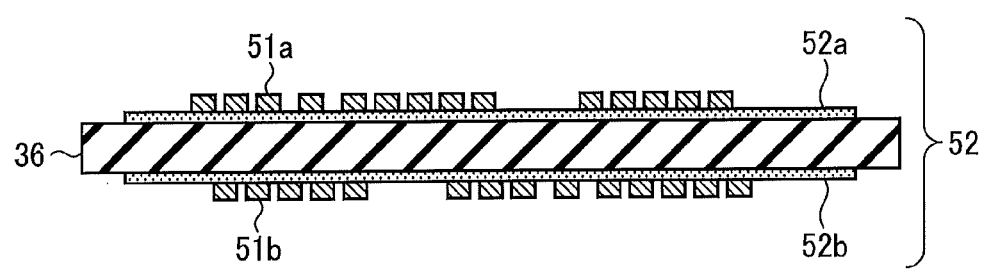
FIG. 3C is a cross-sectional view illustrating the image objects formed on the back surface of the print medium, and the light-blocking objects formed on the back surface of the print medium, the thickness of the light-blocking having been reduced.

FIG. 3C is a cross-sectional view illustrating the image objects 51a and 51b formed on the back surface of the print medium 36, and the light-blocking objects 52a and 52b formed on the back surface of the print medium 36, the thickness of the light-blocking having been reduced. The light-blocking objects 52a and 52b prevent "show-through." The single light-blocking object 52a has a thickness T sufficient for preventing "show-through," so that forming both light-blocking objects 52a and 52b results in an effective light-blocking object light-blocking object thicker than necessary. This is because the light-blocking object light-blocking objects 52a and 52b form a resultant light-blocking object lying between the front image object 51a and the back object 51b, the resultant light-blocking object having an effective thickness of 2 T. The effective light-blocking object is twice as thick as the single light-blocking object 52a or 52b. This implies that twice as much the white developer material 47W as the light-blocking object 52a or 52b is used.

The front image object 51a is formed on the light-blocking object 52a having a thickness half that of the light-blocking object 52a shown in FIG. 3B, and the back image object 51b is formed on the light-blocking object 52b having a thickness half that of the light-blocking object 52b shown in FIG. 3B. In this manner, "show-through" is prevented from occurring, while saving the white developer material 47W.

Figure 4:
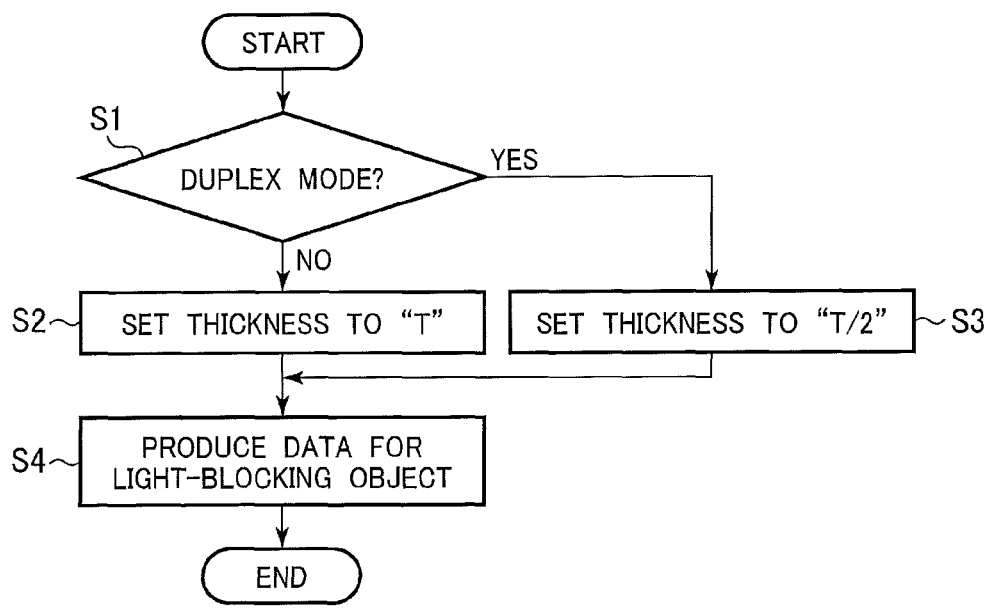
FIG. 4 is a flowchart illustrating the operation or a thickness adjusting process performed by a thickness processing section.

FIG. 4 is a flowchart illustrating the operation or a thickness adjusting process performed by the thickness processing section 25.

A description will be given of the thickness adjusting process.

The thickness processing section 25 makes a decision on whether the print data should be printed in simplex mode or duplex mode.

In the simplex mode, the thickness adjusting section 25 sets the thickness of the light-blocking object to T, so that the light-blocking object 52a having a thickness of T is formed on the entire front surface of the print medium 36.

In duplex mode, the thickness adjusting section 25 sets the thickness of the light-blocking object to T/2, so that the light-blocking objects 52a and 52b each have a thickness of T/2.

Subsequently, the thickness adjusting section 25 produces the data for forming the light-blocking object 52a or 52b according to the setting of thickness, and then ends the thickness adjusting process. The thus produced data for the light-blocking object 52a or 52b is then stored as print data into the display list 17.

The flowchart shown in FIG. 4 will be described.

S1: A check is made to determine whether the print data should be printed in simplex mode or duplex mode. If the print data should be printed in simplex mode, then the program proceeds to S2.

S2: The thickness adjusting section 25 sets the thickness of the light-blocking object to T.

S3: The thickness adjusting section 25 sets the thickness of the light-blocking object to T/2.

S4: The thickness adjusting section 25 produces the data for the light-blocking object, and then drives the printing section 22 to print the light-blocking object 52a or 52b.

As described above, in the duplex mode, the front light-blocking object 52a and the back light-blocking object 52b, each having a thickness of T/2, are solid printed on the front and back surfaces of the print medium 36, respectively, so that the effective thickness of the light-blocking object is T. Forming the front and back light-blocking objects 52a and 52b, each having a thickness of T/2, effectively prevents "show-through," while also saving the amount of the white developer material 47W.

In the first embodiment, the formation of the front and back light-blocking objects is performed by the blocking area determining section 23 and the thickness adjusting section 25 of the editing section 16, and have been described with reference to FIGS. 3 and 4. The front and back light-blocking objects may also be formed using the blocking area determining section 23a and the thickness adjusting section 25a in the printer driver section 13 of the host apparatus 11, thereby printing a light-blocking object based on the image processing performed by the blocking area determining section 23a and the thickness adjusting section 25a.

Second Embodiment

Elements similar to those of the first embodiment have been given similar reference characters and their detailed description is omitted. The description of the operations and advantages similar to those of the first embodiment are also omitted.

Figure 5A:
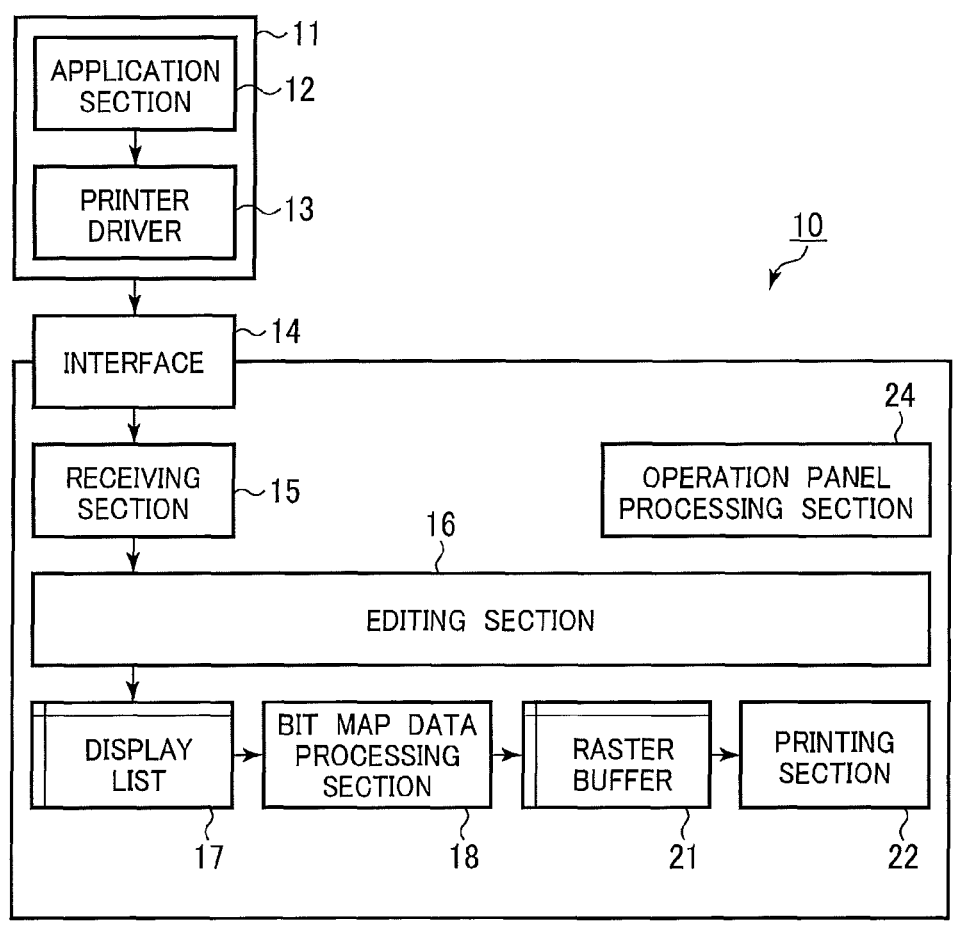
FIG. 5A is a block diagram illustrating the functions of a host apparatus and an image forming apparatus according to a second embodiment.

FIG. 5A is a block diagram illustrating functions of a host apparatus 11 and an image forming apparatus 10 according to a second embodiment.

{When Light-Blocking Object is Formed on Host Apparatus Side}

Figure 5B:
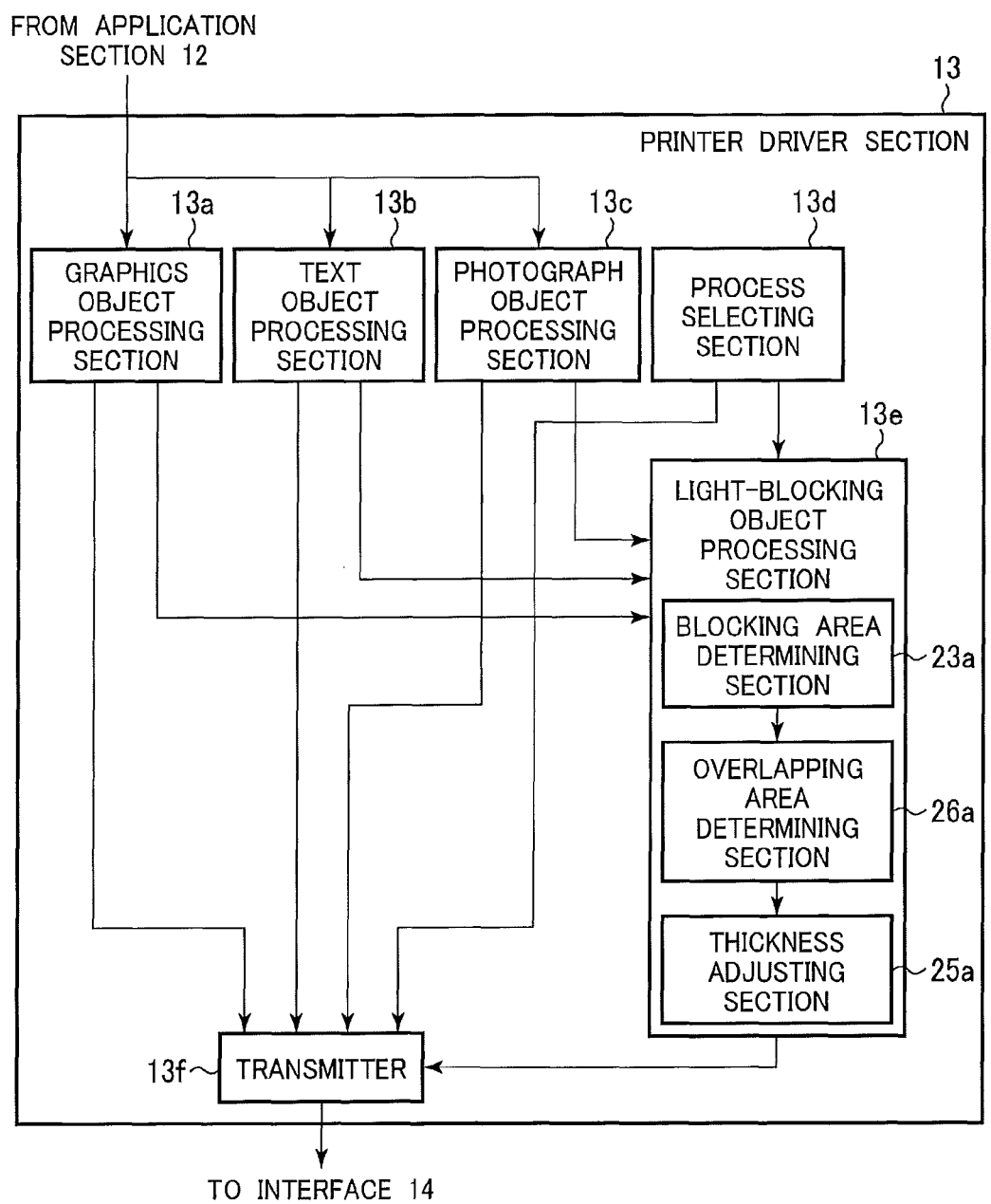
FIG. 5B illustrates the configuration of a printer driver section shown in FIG. 5A.

FIG. 5B illustrates the configuration of the printer driver section 13 of the host apparatus 11. In the second embodiment, a light-blocking object processing section 13e in a printer driver section 13 of a host apparatus 11 includes a blocking area determining section 23a, a thickness adjusting section 25a, and an overlapping area determining section 26a. The blocking area determining section 23a defines the print area in which a light-blocking object 52a or 52b should be printed. This print area is not in the entire printable area of a print medium 36 but only in a limited area in the printable area on the front and/or back surface of the print medium 36, and is substantially equal to the print area in which an image object is actually printed. Specifically, the light-blocking objects 52a and 52b are formed in larger areas than the image objects 51a and 51b, so that the image objects 51a and 51b are within areas occupied by the light-blocking objects.

{When Light-Blocking Object is Formed on Image Forming Apparatus Side}

Figure 5C:
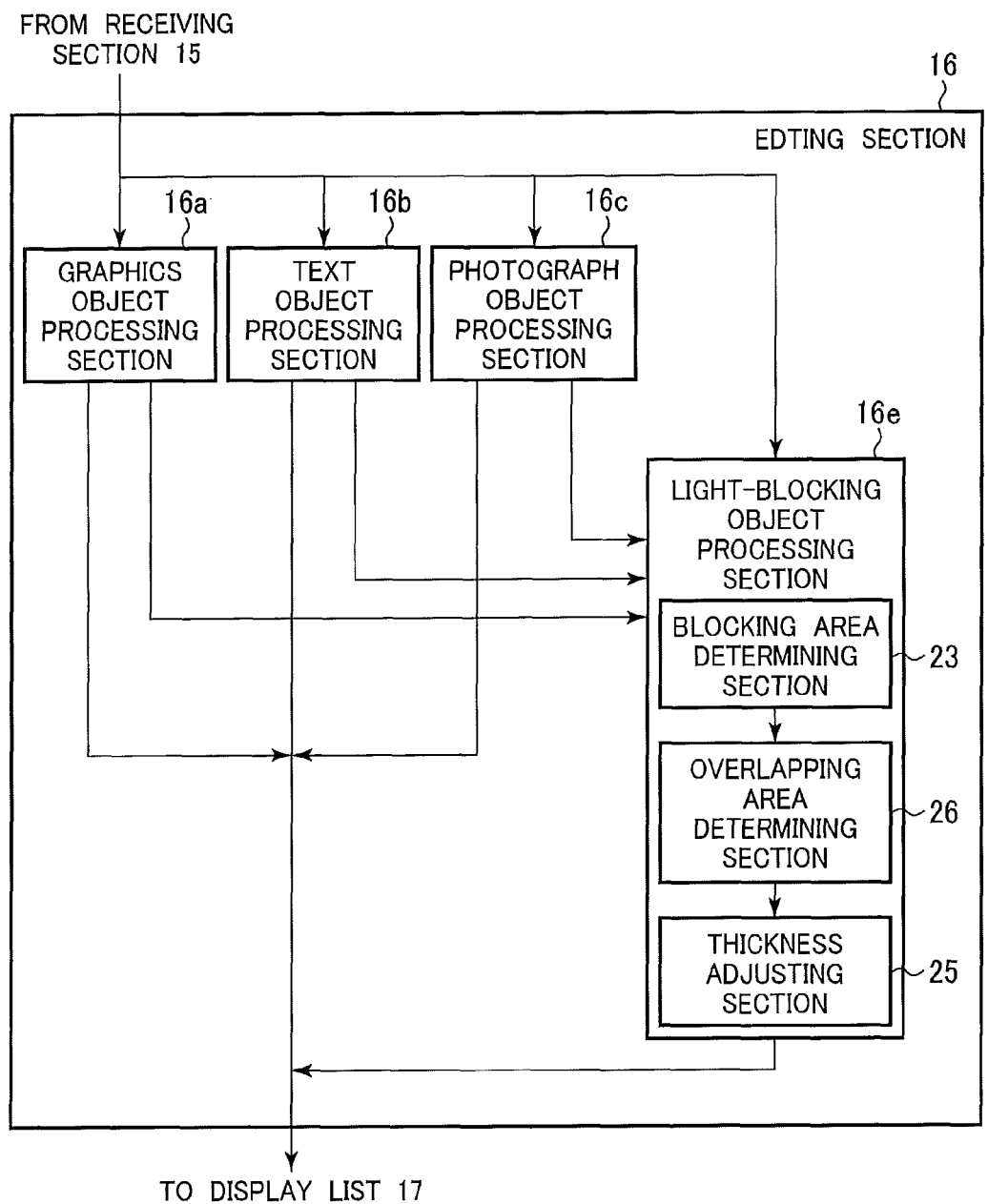
FIG. 5C illustrates the configuration of an editing section 16 shown in FIG. 5A.

FIG. 5C illustrates the configuration of the editing section 16 of the image forming apparatus 10. The blocking object processing section 16e of the editing section 16 of the image forming apparatus 10 includes the blocking area determining section 23, the thickness adjusting section 25, and an overlapping area determining section 26.

The blocking area determining section 23 defines the print area in which a light-blocking object 52a or 52b should be printed. This print area does not occupy the entire printable area of the print medium 36 but only a limited area in which an image object 51a or 51b is actually printed. Specifically, the light-blocking object 52a or 52b is formed in a larger area than the image object 51a or 51b, so that the image object 51a or 51b is completely within an area in which the light-blocking object occupies.

Referring back to FIG. 5B, when the light-blocking object processing section 13e has received, from the process selecting section 13d, a selection "the blocking object data is to be processed on the host apparatus side", the overlapping area determining section 26a makes a decision on whether the print data should be printed in simplex mode or duplex mode. The decision is made based on the instructions contained in the image data received from the application section 12 of the host apparatus 11 or the information set by the process selecting section 13d of the host apparatus 11. If the print data should be printed in duplex mode, the overlapping area determining section 26a determines an area in which the front light-blocking object 52a and the back light-blocking object 52b overlap each other. The front light-blocking object 52a serves as a front light-blocking object. The back light-blocking object 52b serves as a back light-blocking object.

Referring back to FIG. 5C, when the receiving section 15 receives the print data with the information indicative that a light-blocking object determining process should be performed or when the user selects a setting indicative that a light-blocking object determining process should be performed, from the menu through the operation panel processing section 24, the overlapping area determining section 26 makes a decision on whether the print data should be printed in simplex mode or duplex mode, the decision being made based on the instructions contained in the print data or the information set by the user through the operation panel processing section 24. If the print data should be printed in duplex mode, the overlapping area determining section 26 determines a blocking object overlapping area 55 (FIGS. 7A-7C) in which the front light-blocking object 52a and the back light-blocking object 52b overlap each other. The front light-blocking object 52a serves as a front light-blocking object. The back light-blocking object 52b serves as a back light-blocking object.

The thickness adjusting section 25 then adjusts the thickness of the light-blocking object 52a or 52b in the blocking object overlapping area 55, and stores printing information about the blocking object overlapping area 55 into the display list 17.

The configuration of the other portions of the second embodiment is the same as that of the first embodiment and its detailed description is omitted.

{Printing Light-Blocking Object and Image Object}

A description will be given of the operation of the image forming apparatus 10 according to the second embodiment, particularly adjustment of the thickness of the light-blocking object 52a or 52b.

Figure 6A:
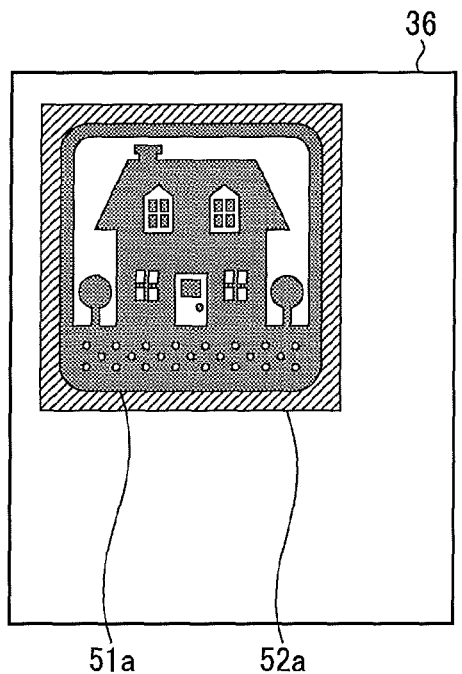
FIG. 6A illustrates the positional relationship between an image object and a light-blocking object on the front surface of the print medium according to the second embodiment.
Figure 6B:
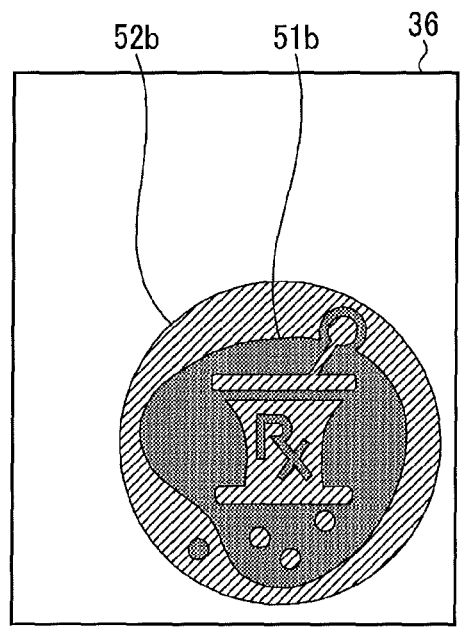
FIG. 6B illustrates the positional relationship between an image object and a light-blocking object on the back surface of the print medium.
Figure 6C:
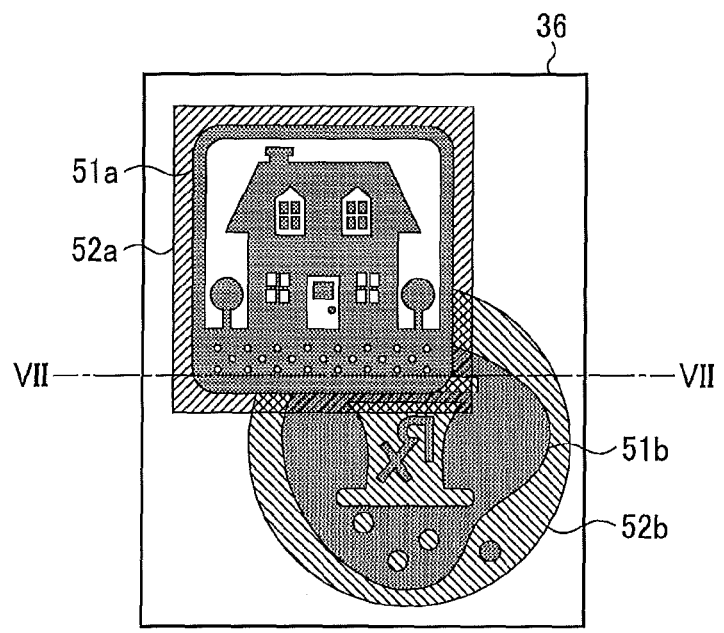
FIG. 6C illustrates the image object and the light-blocking object on the front surface that overlap the image object and the light-blocking object on the back surface.

FIG. 6A illustrates the positional relationship between an image object 51a and a light-blocking object 52a on the front surface of the print medium 36. FIG. 6B illustrates the positional relationship between an image object 51b and a light-blocking object 52b on the back surface of the print medium 36. FIG. 6C illustrates the image object 51a and the light-blocking object 52a on the front surface that overlap the image object 51b and the light-blocking object 52b on the back surface.

In the first embodiment, the light-blocking objects 52a and 52b are formed on the entire printable areas on the front and back surfaces of the print medium 36. In the second embodiment, the light-blocking object 52a or 52b is formed in an area whose entire perimeter extends outwardly further than the image object 51a or 51b, on the front or back surface of the print medium 36, as shown in FIGS. 6A and 6B. In other words, the light-blocking object 52a is in an area larger than is the image object 51a, so that the image object 51a can be within that area. The light-blocking object 52b is in an area larger than is the image object 51b, so that the image object 51b can be within that area.

As shown in FIG. 6A, the front light-blocking object 52a is solid-printed on the front surface of the print medium 36 with the white developer material 47W, and the front image object 51a is printed on the light-blocking object 52a with the black, yellow, magenta, and cyan developer materials 47K, 47Y, 47M, and 47C. Also, as shown in FIG. 6B, the back light-blocking object 52b is solid-printed on the back surface of the print medium 36 with the white developer material 47W, and the back image object 51b is printed with the black, yellow, magenta, and cyan developer materials 47K, 47Y, 47M, and 47C.

It is to be noted that the front image object 51a and the front light-blocking object 52a in FIG. 6A are not on a side of the print medium 36 exactly opposite the back image object 51b and the back light-blocking object 52b in FIG. 6B, i.e., the print areas of image objects on the front and back surfaces of the print medium 36 are not substantially in line with each other. Instead, as shown in FIG. 6C, the front image object 51a and the front light-blocking object 52a formed on the front surface of the print medium 36 overlap the back image object 51b and the back light-blocking object 52b formed on the back surface.

Figure 7A:
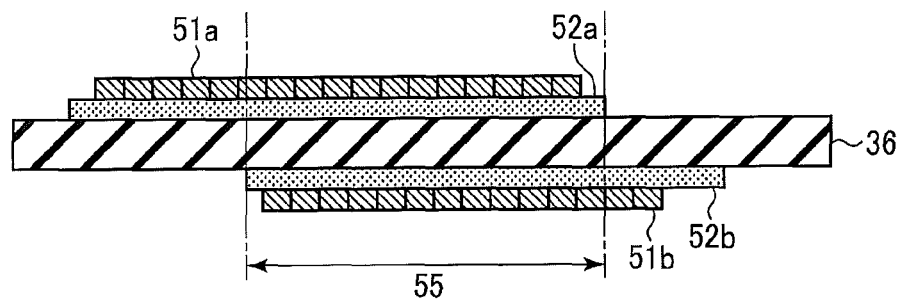
FIG. 7A illustrates the light-blocking objects that are formed on the front and back surfaces of the print medium and have a thickness of T.
Figure 7B:
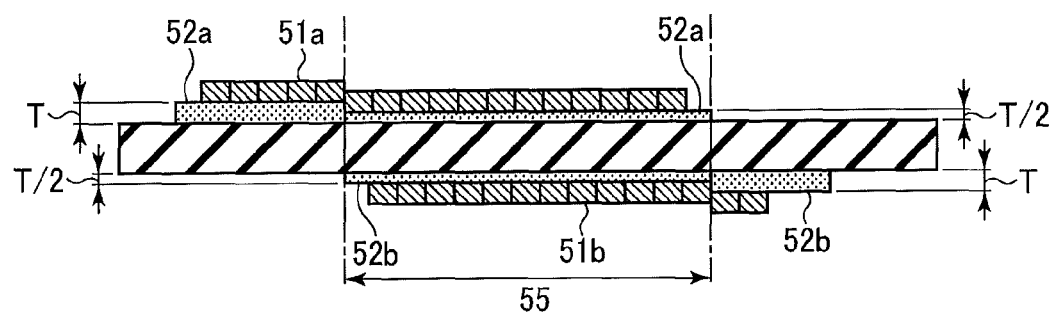
FIG. 7B illustrates the light-blocking objects whose the thickness has been adjusted or reduced.
Figure 7C:
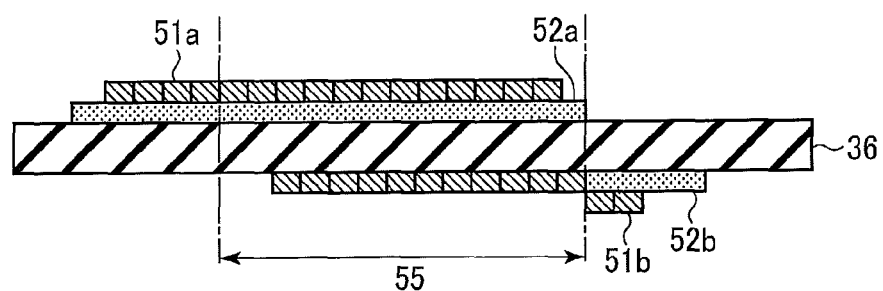
FIG. 7C illustrates the light-blocking object having a thickness of T on the front surface of the print medium, and the light-blocking object having no portions that fall in a blocking object overlapping area.

FIGS. 7A-7C are cross-sectional views taken along a line VII-VII in FIG. 6C. FIG. 7A illustrates the light-blocking objects 52a and 52b that are formed on the front and back surfaces of the print medium 36 and have a thickness of T. The thickness T is such that the print results on the medium 36 are free from "show-through." FIG. 7B illustrates the light-blocking objects 52a and 52b whose the thickness has been adjusted or reduced. FIG. 7C illustrates the light-blocking object 52a having a thickness of T on the front surface of the print medium 36, and the light-blocking object 52b having no portions that fall in the blocking object overlapping area 55.

In FIG. 7A, the front light-blocking object 52a has a thickness of T and the back light-blocking object 52b also has a thickness of T. This implies that the white developer material 47W is excessively used in the blocking object overlapping area 55. Specifically, the white developer material 47W consumed per unit area in the blocking object overlapping area 55 is twice as much as that consumed in the area outside the blocking object overlapping area 55.

Referring to FIG. 7B, the front and back light-blocking objects 52a and 52b have a thickness of T/2 in the blocking object overlapping area 55, so that the effective thickness of light-blocking object is T (=T/2+T/2).

In FIG. 7C, the light-blocking object 52a on the front surface of the print medium 36 has a thickness of T in the blocking object overlapping area 55, and no light-blocking object is formed in the blocking object overlapping area 55 on the back surface of the print medium 36. It is to be note that the light-blocking objects 52a and 52b outside the blocking object overlapping area 55 have a thickness of T. This configuration prevents "show-through" of the front image object 51a and the back image object 51b from occurring, while also saving the white developer material 47W.

{Operation of Thickness Adjusting Section}

The operation of the thickness adjusting section 25 will be described.

Figure 8:
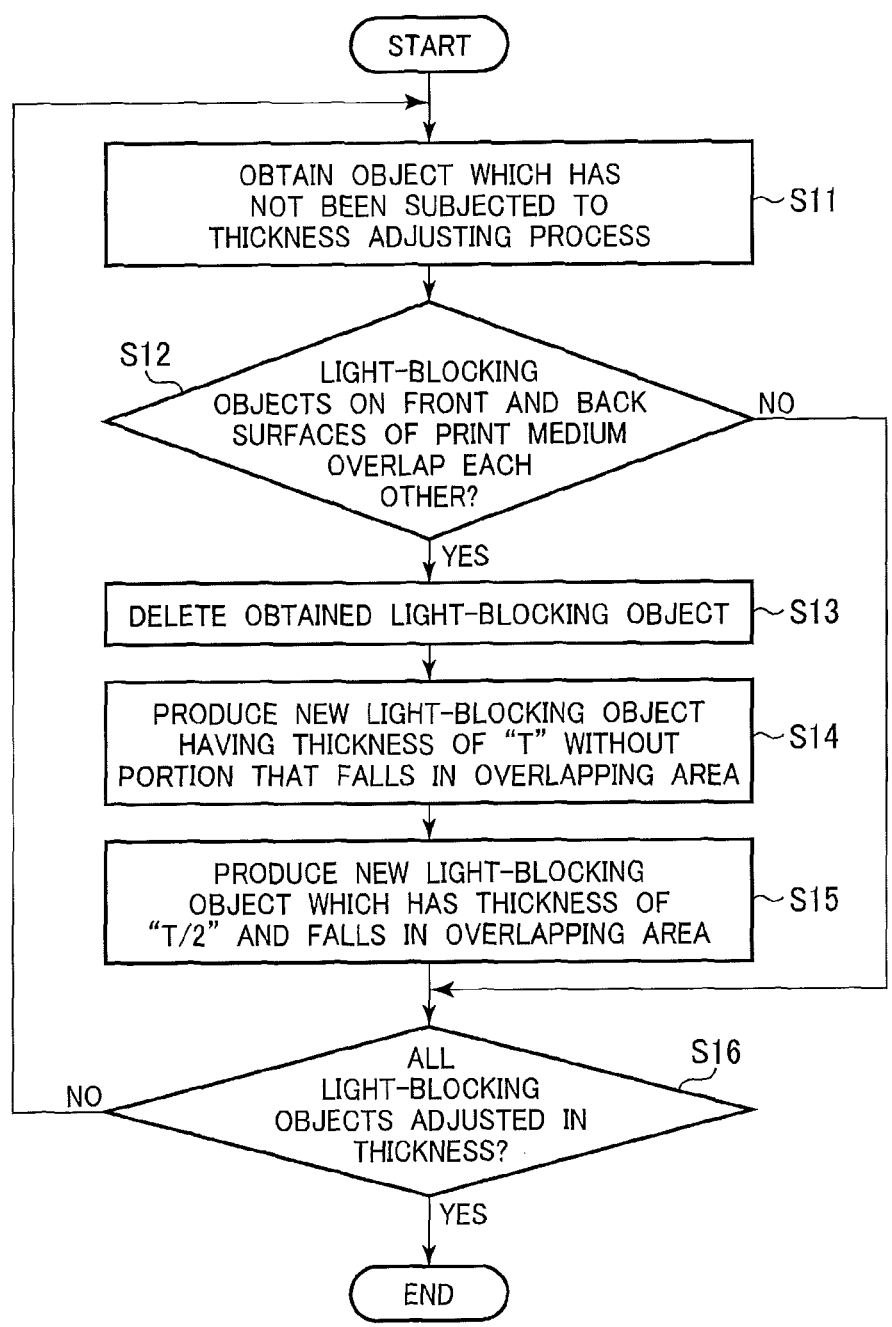
FIG. 8 is a flowchart illustrating the operation of the thickness adjusting section according to the second embodiment.

FIG. 8 is a flowchart illustrating the operation of the thickness adjusting section 25 according to the second embodiment.

The thickness adjusting section 25 obtains a light-blocking object to be subjected to a thickness adjusting process.

Subsequently, the overlapping area determining section 26 determines whether the blocking object overlapping area 55 exists, and then informs the thickness adjusting section 25 of whether the light-blocking object overlaps a light-blocking object on the other surface of the print medium 36.

If the overlapping area determining section 26 determines that blocking object overlapping area 55 does not exist, the thickness adjusting section 25 then makes a decision on whether all the light-blocking objects have been subjected to the thickness adjusting process. If all the light-blocking objects have been subjected to the thickness adjusting process, the thickness adjusting section 25 ends its operation.

If the overlapping area 55 exists, the thickness adjusting section 25 deletes from the display list 17 the obtained light-blocking object that has not been subjected to the thickness adjusting process.

The thickness adjusting section 25 produces a new front light-blocking object 52a as a light-blocking object and a new back light-blocking object 52b as a light-blocking object, the new front and back light-blocking objects 52a and 52b having a thickness of T and not containing a portion that falls in the blocking object overlapping area 55.

Subsequently, the thickness adjusting section 25 produces another new front light-blocking object as a light-blocking object 52a and another new back light-blocking object as a light-blocking object 52b, the another new front and back light-blocking objects 52a and 52b having a thickness of T/2 and falling in the blocking object overlapping area 55.

Subsequently, the thickness adjusting section 25 makes a decision on whether all the light-blocking objects have been subjected to the thickness adjusting process.

If any light-blocking object has not been subjected to thickness adjustment, the thickness adjusting section 25 performs the thickness adjusting process on that light-blocking object.

If all the light-blocking objects have been subjected to the thickness adjusting process, the thickness adjusting section 25 ends the thickness adjusting process.

The flowchart shown in FIG. 8 will be described.

S11: The thickness adjusting section 25 obtains the objects which have not been subjected to the thickness adjusting process.

S12: The thickness adjusting section 25 makes a decision on whether a light-blocking object on one surface of the print medium 36 overlaps a light-blocking object on the other surface of the print medium 36. If the answer is YES, the program proceeds to S13. If the answer is NO, the program jumps to S16.

S13: The thickness adjusting section 25 deletes from the display list 17 the obtained light-blocking object obtained at S11.

S14: The thickness adjusting section 25 produces a new light-blocking object to be formed on a surface of the print medium 36, the new light-blocking object having a thickness of T and not having a portion that falls in the blocking object overlapping area 55.

S15: The thickness adjusting section 25 produces another new light-blocking object, the another new light-blocking object having a thickness of T/2 and falling in the blocking object overlapping area 55.

S16: The thickness adjusting section 25 makes a decision on whether all the light-blocking objects have been subjected to the thickness adjusting process. If the answer is YES, the program ends. If the answer is NO, the program jumps back to S11.

As described above, portions of the front light-blocking object 52a and the back light-blocking object 52b that fall in the blocking object overlapping area 55 have been described as having a thickness of T/2. Instead, portions of light-blocking objects 52a and 52b may be configured such that one of the front light-blocking object 52a and the back light-blocking object 52b has a portion that falls in the blocking object overlapping area 55 and has a thickness of T, while the other of the front light-blocking object 52a and the back light-blocking object 52b is not formed at all. In short, the "show-through" may be eliminated if the sum of the thicknesses of portions of the front light-blocking object 52a and the back light-blocking object 52b that fall in the blocking object overlapping area 55 is at least T. Alternatively, one of the front light-blocking object 52a and the back light-blocking object 52b may have a portion that falls in the blocking object overlapping area 55 and has a thickness of, for example, 0.7 T, while the other of the front light-blocking object 52a and the back light-blocking object 52b may have a portion that falls in the blocking object overlapping area 55a and has a thickness of, for example, 0.3 T. In other words, "show-through" may be prevented as long as the effective thickness of light-blocking object between the image objects 51a and 51b is T.

If a print medium is less likely to cause "show-through" than the print medium 36, each of the front light-blocking object 52a and the back light-blocking object 52b may have a decreased thickness of, for example, 0.3 T. Still alternatively, if a print medium is more likely to cause "show-through" than the print medium 36, each of the front light-blocking object 52a and the back light-blocking object 52b may have a thickness of, for example, 0.7 T, i.e., greater than 0.5 T.

In the second embodiment, the light-blocking object 52a and the light-blocking object 52b are not formed on the entire printable area of the print medium 36 but only in an area in which the image object 51a and 51b are formed. Therefore, "show-through" may still be prevented from occurring and the white developer material 47W can be saved.

The sum of the thicknesses of the front light-blocking object 52a and the back light-blocking object 52b that fall in the blocking object overlapping area 55 is equal to the thickness of the front light-blocking object 52a or the back light-blocking object 52b that does not fall in the blocking object overlapping area 55. This configuration prevents "show-through" and saves the white developer material 47W.

In the second embodiment, the representation shown in FIG. 6 and the flowchart shown in FIG. 7 are based on the operation of the blocking area determining section 23, thickness adjusting section 25, and overlapping area determining section 26. Likewise, the blocking area determining section 23a, the thickness adjusting section 25a, and the overlapping area determining section 26a of the host apparatus 11 also cooperate to process images, thereby producing the light-blocking objects based on the processed images.

Third Embodiment

Elements similar to those of the first and second embodiments have been given similar reference characters and their detailed description is omitted. The description of the operations and advantages similar to those of the first and second embodiments are also omitted.

Figure 9A:
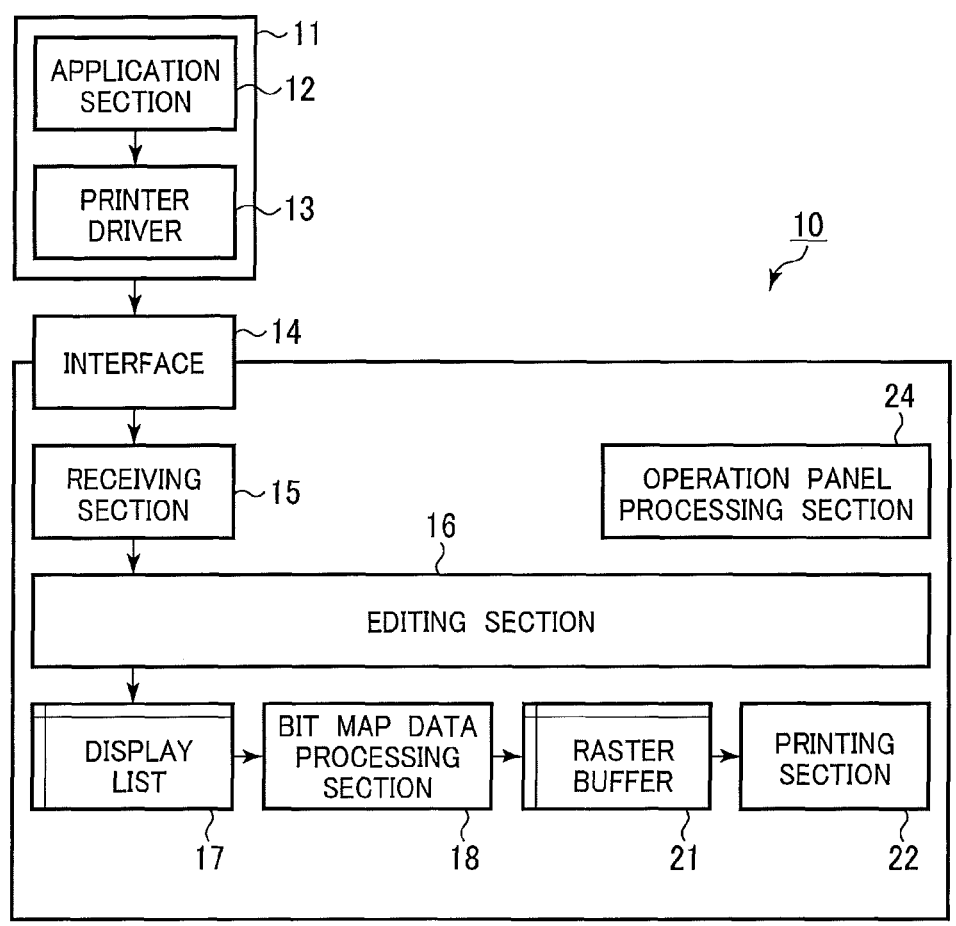
FIGS. 9A-9C are block diagrams illustrating the functions of an image forming apparatus according to a third embodiment.
Figure 9B:
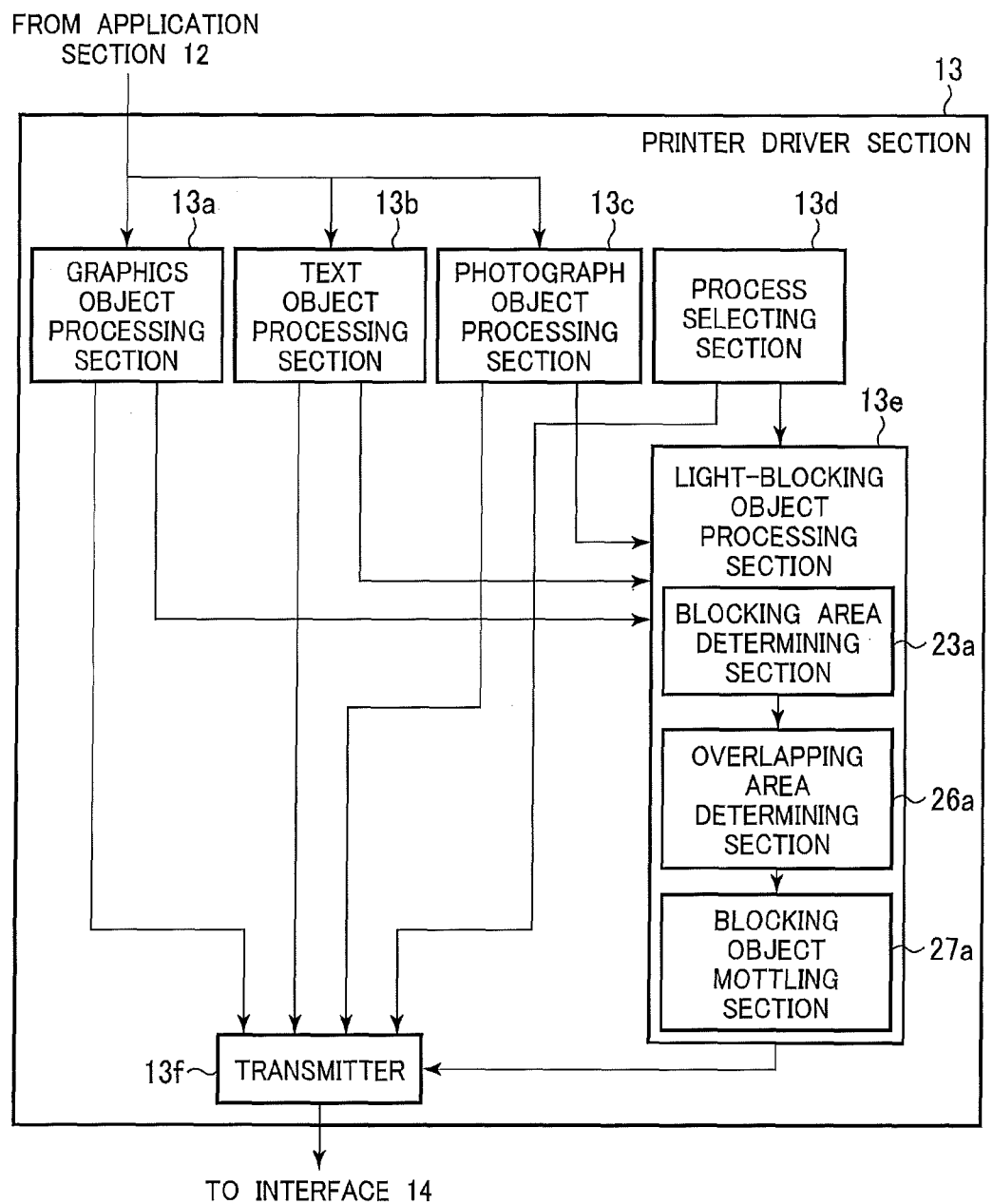
Figure 9C:
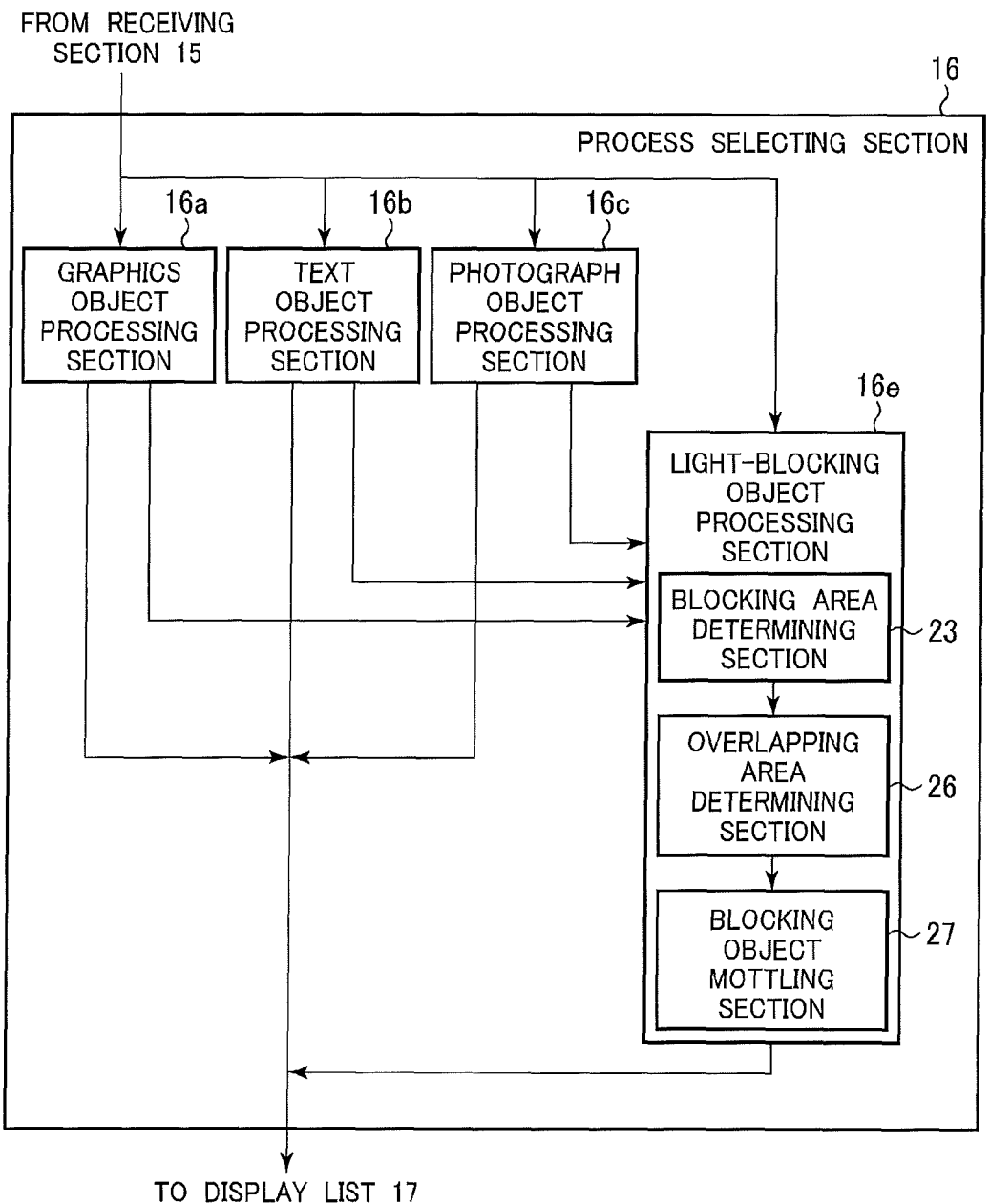

FIGS. 9A-9C are block diagrams illustrating the functions of a host apparatus and an image forming apparatus according to a third embodiment.

{When Light-Blocking Object is Formed on Host Apparatus Side}

FIG. 9B illustrates the functions of the printer driver section 13 of the host apparatus 11. The printer driver section 13 includes a blocking object mottling section 27a in place of the thickness adjusting section 25a (FIGS. 2B and 5B). A blocking area determining section 23a defines print areas in which light-blocking objects should be printed on the front and back surfaces of a print medium 36. The defined print areas are wide enough so that the light-blocking object is substantially the same shape and size as image objects formed thereon.

When a light-blocking object processing section 13e receives a user's selection indicative that a light-blocking object processing should be performed on the host apparatus 11 side, the blocking object mottling section 27a thins or mottles a front light-blocking object 52a and a back light-blocking object 52b without portions that fall in the blocking object overlapping area 55 defined by an overlapping area determining section 26a. In other words, the blocking object mottling section 27a removes parts of the front light-blocking object 52a and a back light-blocking object 52b. The blocking object mottling section 27a then stores into a display list 17 print information indicative that the front light-blocking object 52a and the back light-blocking object 52b have no portions that fall in the blocking object overlapping area 55. In the third embodiment, the print areas of the light-blocking object 52a and the image object 51a are substantially congruent, and the print areas of the light-blocking objects 52b and the image object 51b are also substantially congruent. It is to be noted that the size of the areas occupied by the light-blocking objects 52a and 52b are somewhat exaggerated in size for the sake of explanation. Further, the blocking object overlapping area 55 and a later-described image object overlapping area 56 are substantially congruent.

{When Light-Blocking Object is Formed on Image Forming Apparatus Side}

FIG. 9C illustrates the functions of the editing section 16 of the image forming apparatus 10. The editing section 16 includes a blocking object mottling section 27 in place of the thickness adjusting section 25 of the first and second embodiments. A blocking area determining section 23 defines print areas of light-blocking objects on the front and back surfaces of the print medium 36. The light-blocking objects and the image objects formed in the print areas have substantially the same outlines or contours, i.e., they are substantially congruent. Specifically, the light-blocking object 52a and the image object 51a are substantially mirror images of each other. The light-blocking object 52b and the image object 51b also substantially mirror images of each other.

A receiving section 15 receives print data together with information indicative that a light-blocking object determining process should be performed, or the user's selection indicative that a light-blocking object determining process should be performed. The user's selection is made from the menu through operational panel processing section 24. The blocking object mottling section 27 deletes portions or pixels of the front light-blocking object 52a and the back light-blocking object 52b from areas in which some of pixels of the front image object 51a are positioned directly over portions or pixels of the back image object 51b.

The blocking object mottling section 27 then stores print information about the portions or pixels into the display list 17. In the third embodiment, the print area of the light-blocking object 52a and that of the image object 51a are substantially congruent, and the print area of the light-blocking objects 52b and that of the image object 51b are also substantially congruent. Therefore, the blocking object overlapping area 55 and the image object overlapping area 56 are substantially congruent. The print area of the light-blocking object 52a and that of the image object 51a may be slightly different in size. Likewise, the print area of the light-blocking objects 52b and that of the image object 51b may be slightly different in size.

The configuration of the other portions of the host apparatus 11 and the image forming apparatus 10 is the same as that of the first embodiment and the detailed description is omitted.

{Printing Light-Blocking Object and Image Object}

A description will be given of the operation of the image forming apparatus 10 according to the third embodiment, particularly the adjustment of the print area of the light-blocking objects 52a and 52b performed by the light-blocking object mottling section 27.

Figure 10A:
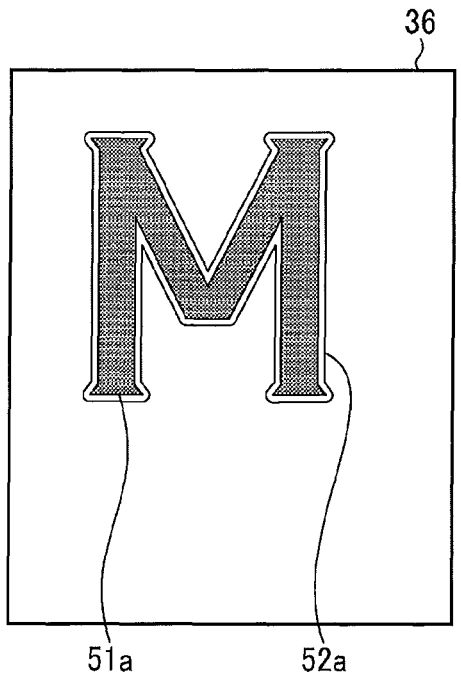
FIG. 10A illustrates the image object and the light-blocking object formed on the front surface of the print medium.
Figure 10B:
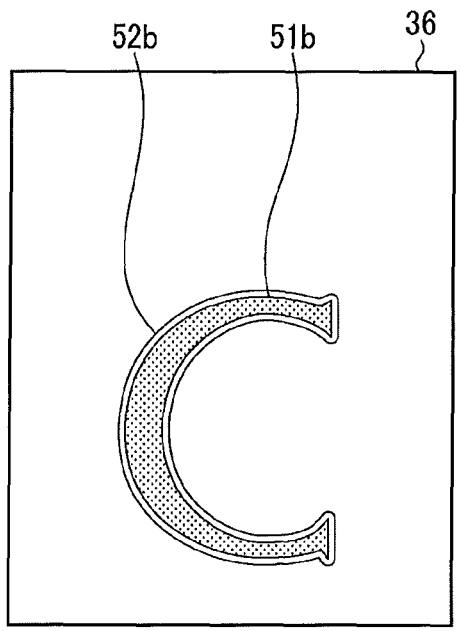
FIG. 10B illustrates the image object and the light-blocking object formed on the back surface of the print medium.
Figure 10C:
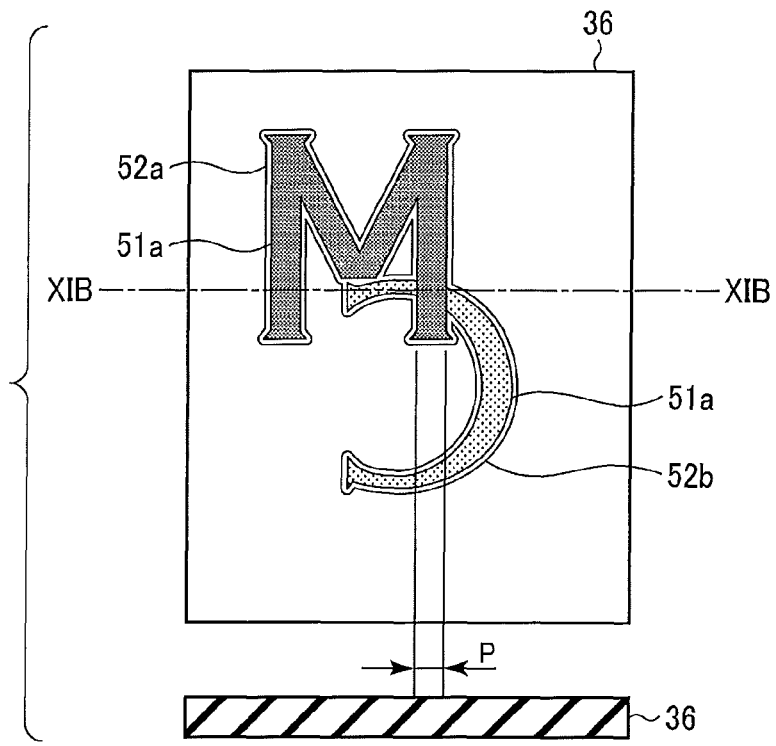
FIG. 10C illustrates the image object and the light-blocking objects formed on the front surface of the print medium that overlap the image object and the light-blocking object formed on the back surface.
Figure 10D:
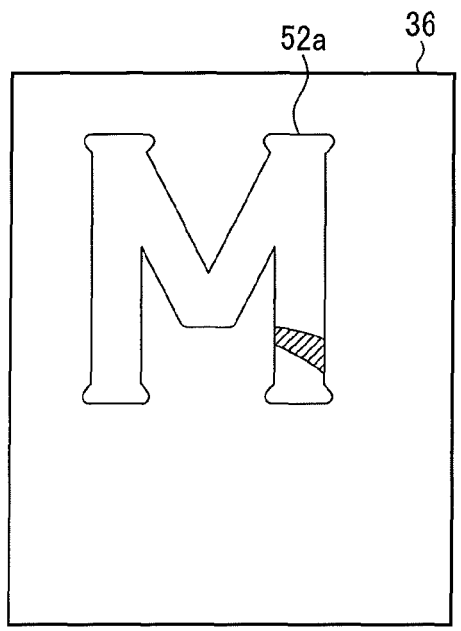
FIGS. 10D and 10E illustrate the resultant light-blocking object after adjusting the print area of the light-blocking objects.
Figure 10E:
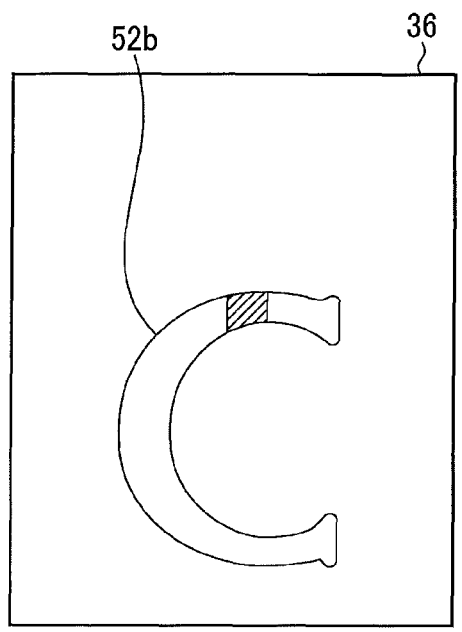

FIG. 10A illustrates the image object 51a and the light-blocking object 52a formed on the front surface of the print medium 36. FIG. 10B illustrates the image object 51b and the light-blocking object 52b formed on the back surface of the print medium 36. FIG. 10C illustrates the image object 51a and the light-blocking objects 52a formed on the front surface of the print medium 36 and the image object 51b and the light-blocking object 52b formed on the back surface. It is to be noted that the image object 51a overlaps the image object 51b in an area P as shown in FIG. 10C, or portions or pixels of the image object 51a are positioned over the image object 51b in an area P. FIGS. 10D and 10E illustrate the resultant light-blocking object 52a and 52b after adjusting the print area of the light-blocking objects 52a and 52b.

In the second embodiment, the light-blocking objects 52a and 52b extend outwardly of the image objects 51a and 51b, respectively, to some extent. In contrast, in the third embodiment, the image object and the light-blocking object are substantially congruent.

As shown in FIG. 10A, the front light-blocking object 52a is formed of a white developer material 47W on the front surface of the print medium 36, having a thickness of T which is thick enough for the print results on the medium 36 to be free from "show-through." The front image object 51a is formed of the black, yellow, magenta, and cyan developer materials 47K, 47Y, 47M, and 47C on the front light-blocking object 52a. The front light-blocking object 52a and the front image object 51a are substantially congruent. As shown in FIG. 10B, the back light-blocking object 52b having a thickness of T is formed on the back surface of the print medium 36. The back image object 51b, which is formed of the developer materials 47K, 47Y, 47M, and 47C, is formed on the back light-blocking object 52b. The back light-blocking object 52b and the back image object 51b are substantially congruent.

It is to be noted that the front image object 51a and the front light-blocking object 52a are not positioned exactly opposite the back image object 51b and the back light-blocking object 52b, or the front image object 51a and the front light-blocking object 52a are not in line with the back image object 51b and the back light-blocking object 52b, respectively. Instead, the front image object 51a and the front light-blocking object 52a overlap the back image object 51b and the back light-blocking object 52b as shown in FIG. 10C. Referring to FIGS. 10D and 10E, it is to be noted that the hatched areas are missing from the light-blocking object.

Figure 11A:
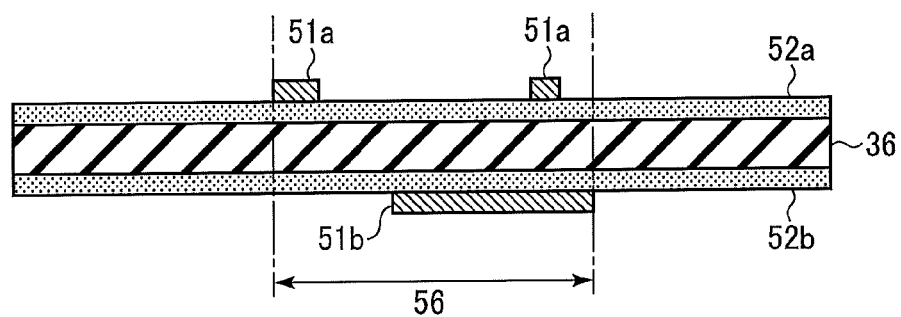
FIG. 11A is a cross-sectional view illustrating the light-blocking objects which are formed on the front and back surfaces of the print medium and have a thickness of T.

FIG. 11A is a cross-sectional view illustrating the light-blocking objects 52a and 52b having a thickness of T formed on the front and back surfaces of the print medium 36, the image objects 51a and 51b being formed directly on the light-blocking objects 52a and 52b, respectively.

{Mottling the Light-Blocking Object}

Referring to FIG. 11A, the front light-blocking object 52a and the back light-blocking object 52b have portions, which fall in the image object overlapping area 56 and have a thickness of T. When the front image object 51a and the back object 51b were exact mirror images of each other and the printed pixels of the front and back image objects 51a and 51b had the same color, there would be a one-to-one correspondence between each point of the image object 51a with a single point of the back image object 51b so that "show-through" is not perceived by the human eye even if "shown-through" has actually occurred, in which case the front light-blocking object 52a and the back light-blocking object 52b are not needed and the white developer material 47W can be saved. However, the front image object 51a and the back image object 51b are usually not mirror images of each other, in which case some pixels of the front image object 51a and some pixels of the back image object 51b are positioned one over the other, while the other pixels of the front image object 51a and the other pixels of the back image object 51b are not positioned one over the other. Therefore, "show-through" is perceived by the human eye in areas where printed pixels of the front image object 51a and printed pixels of the back image object 51b are not positioned one over the other. That is, prints on one side of the print medium 36 may be seen through the other side of the print medium 36. The third embodiment solves this drawback.

Figure 11B:
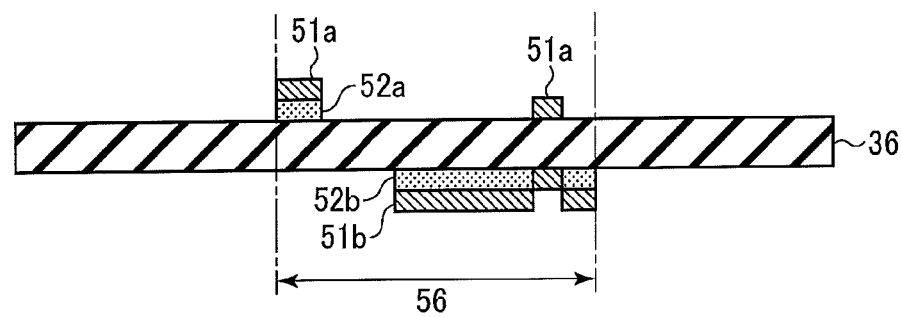
FIG. 11B illustrates an image object overlapping area in which the light-blocking objects are formed except for areas in which the image object on the front surface of the medium and the image object on the back surface are printed such that pixels of the image objects on the front surface are mirror images of pixels of the image object on the back surface.

FIG. 11B is a cross-sectional view taken along a line XIB-XIB in FIG. 10C, illustrating the image object overlapping area 56 in which the light-blocking objects 52a and 52b are formed only in areas where pixels of either the image object 51a or the image object 51b are formed on the print medium 36. Thus, the resultant light-blocking objects 52a and 52b look as if they have been mottled or thinned as a whole. In this manner, the "show-through" of the front image object 51a and the back image object 51b can be prevented and the white developer material 47W can be saved.

The operation of the blocking object mottling section 27 will be described.

Figure 12:
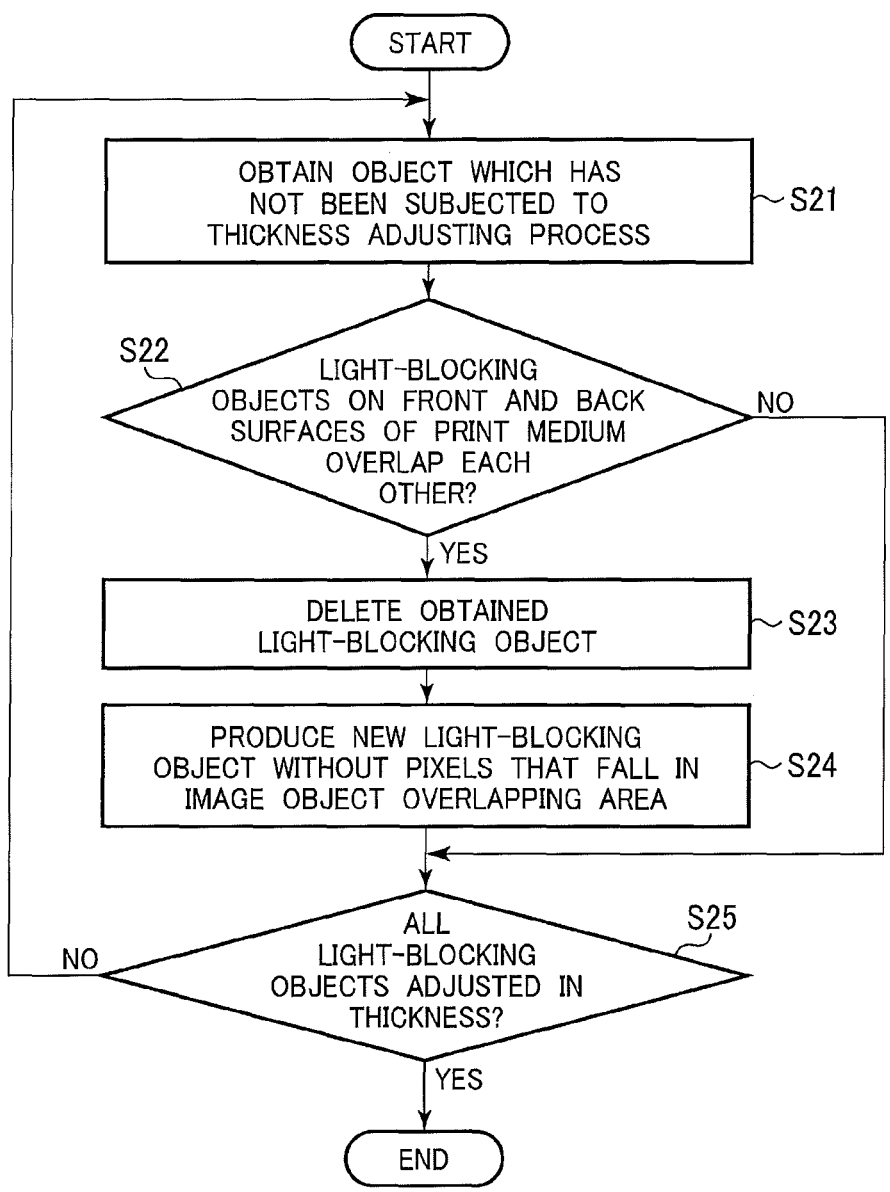
FIG. 12 is a flowchart illustrating the operation of a blocking object mottling section according to the third embodiment.

FIG. 12 is a flowchart illustrating the operation of the blocking object mottling section 27 according to the third embodiment.

The blocking object mottling section 27 obtains from the display list 17 an unadjusted light-blocking object, which has not been subjected to a thickness adjusting process in which the thickness of light-blocking object to be printed on the print medium is adjusted or reduced.

Subsequently, the blocking object mottling section 27 determines whether the front and back light-blocking objects 52a and 52b overlap each other, i.e., whether there is the blocking object overlapping area 55. In the third embodiment, the light-blocking object overlapping area 55 and the image object overlapping area 56 are substantially congruent.

If there does not exist the light-blocking object overlapping area 55 in the unadjusted light-blocking object, then the blocking object mottling section 27 makes a decision on whether all other the light-blocking objects have been subjected to the thickness adjusting process. If all the light-blocking objects have been adjusted, the blocking object mottling section 27 ends the blocking object mottling process.

If there exists the light-blocking object overlapping area 55, the blocking object mottling section 27 deletes from the display list 17 the obtained light-blocking object, which has not been subjected to the thickness adjusting process.

The blocking object mottling section 27 then produces light-blocking objects to be formed on surfaces of the print medium 36, the light-blocking objects having no pixels that are positioned over pixels of a light-blocking object on the other surface of the print medium 36. The blocking object mottling section 27 then stores the thus produced light-blocking objects into the display list 17. Only a single light blocking object which is thick enough to prevent "show-through" may be formed either on the front surface of back surface of the print medium 36.

The blocking object mottling section 27 then makes a decision on whether all the light-blocking objects have been processed.

If the blocking object mottling section 27 determines that pixels of the front light-blocking object are not positioned over pixels of the back light-blocking object, then the blocking object mottling section 27 determines whether all the light-blocking objects on the front and back surfaces of the print medium 36 have been adjusted.

If any light-blocking object has not been subjected to the thickness adjusting process yet, then the blocking object mottling section 27 obtains that non-adjusted light-blocking object and repeats the aforementioned operations on that non-adjusted light-blocking object.

If all the light-blocking objects have been adjusted, the blocking object mottling section 27 ends the blocking object mottling process.

The flowchart shown in FIG. 12 will be described.

S21: The blocking object mottling section 27 obtains the non-adjusted light-blocking object from the display list 17.

S22: The blocking object mottling section 27 determines whether pixels of the front light-blocking object are positioned over pixels of the back light-blocking object. If the answer is YES, the program proceeds to S23, if the answer is NO, the program jumps to S25.

S23: The blocking object mottling section 27 deletes the obtained non-adjusted light-blocking object from the display list 17.

S24: The blocking object mottling section 27 produces a light-blocking object 52a or 52b to be printed on one surface of the print medium 36, the light-blocking object 52a or 52b not having pixels in areas in which the pixels of the image object 51a or 51b on the one surface are positioned over the pixels of the image object 51b or 51a on the other surface.

S25: The blocking object mottling section 27 determines whether all the light-blocking objects on the front and back surfaces of the print medium 36 have been adjusted. If the answer is YES at S25, the program ends; if the answer is NO, the program jumps back to S21.

In the third embodiment, the representation shown in FIG. 11 and the flowchart shown in FIG. 12 are based on the operation of the overlapping area determining section 26 and the blocking object mottling section 27, all being in the editing section 16 of the image forming apparatus. Likewise, the blocking area determining section 23a, the overlapping area determining section 26a, and the blocking object mottling section 27a in the printer driver section 13 of the host apparatus 11 also cooperate to process images, thereby producing light-blocking objects based on the processed images.

The present invention is not limited to the first, second, and third embodiments, but may be modified in a variety of forms without departing from the scope of the invention.

What is claimed is:

1. An image data processing apparatus, comprising:
a light-blocking object processing section configured to produce
  a first light-blocking object on which a first image object is formed and which is formed on a front surface of a medium, and
  a second light-blocking object on which a second image object is formed and which is formed on a back surface of the medium,
if the first image object is to be formed in a first area, the second image object is to be formed in a second area, and the first area and the second area define an overlapping area in which the first image object overlaps the second image object with the medium therebetween, then the light-blocking object processing section performs one of
  a first process in which the first and second light-blocking objects have a thickness smaller in the overlapping area than that of the first and second light-blocking objects in a third area outside the overlapping area, and
  a second process in which one of the first and second light-blocking objects is not formed.

2. An image data processing apparatus, comprising:
an image object producing section configured to produce
  a first image object formed on a front surface of a medium, and
  a second image object formed on a back surface of the medium;
a light-blocking object processing section configured to produce
  a first light-blocking object formed as an underlayer of the first image object and is in a first area between the first image object and the medium, and
  a second light-blocking object which is formed as an underlayer of the second image object and is in a second area between the second image object and the medium; and
an overlapping area determining section configured to determine
  an overlapping area in which the first area and the second area overlap each other with the medium between the first area and the second area, and
  a third area in which the first area and the second area do not overlap each other,
wherein the light-blocking object processing section produces the first light-blocking object and the second light-blocking object so that at least one of the first light-blocking object and the second light-blocking object has a first selected thickness in the overlapping area that is smaller than a second selected thickness thereof in the third area.

3. The image data processing apparatus according to claim 2, wherein the image object producing section is further configured to produce
  a first item of image object data that describes the first image object, and
  a second item of image object data that describes the second image object.

4. The image data processing apparatus according to claim 3, wherein the light-blocking object processing section includes
  a print area determining section configured to determine the first area and the second area; and
  a thickness adjusting section configured
    to set a first portion of the first light-blocking object and a first portion of the second light-blocking object, which each fall in the overlapping area, to each have the first selected thickness, and
    to set a second portion of the first light-blocking object and a second portion of the second light-blocking object, which each fall in the third area, to each have the second selected thickness.

5. The image data processing apparatus according to claim 4, wherein the first selected thickness is half the second selected thickness.

6. The image data processing apparatus according to claim 4, wherein the first image object is within the first area and the second image object is within the second area.

7. The image data processing apparatus according to claim 4, wherein the first area has substantially the same shape and size as the first image object, and the second area has substantially the same shape and size as the second image object.

8. The image data processing apparatus according to claim 4, wherein a sum of the first selected thickness of the first light-blocking object and the first selected thickness of the second light-blocking object is substantially equal to each of the second selected thicknesses of the first and second light-blocking objects that fall in the third area.

9. The image data processing apparatus according to claim 4, wherein the second selected thickness is a minimum required thickness so that the first or second image object formed on one of the front and back surfaces of the medium cannot be seen through the other of the front and back surfaces of the medium.

10. The image data processing apparatus according to claim 2, wherein the light-blocking object processing section further includes a blocking object mottling section configured to delete first pixels of the first light-blocking object and second pixels of the second light-blocking object, the pixels falling in the overlapping area and the first pixels and the second pixels being positioned one over the other.

11. The image data processing apparatus according to claim 2,
wherein the first light-blocking object is formed in an area substantially congruent to an area in which the first image object is formed,
wherein the second light-blocking object is formed in an area substantially congruent to an area in which the second image object is formed.

12. The image data processing apparatus according to claim 2, wherein the light-blocking object processing section produces the first and second light-blocking objects such that one of the first and second light-blocking objects has the first selected thickness which is smaller than a thickness of the other of the first and second light-blocking objects.

13. An image data processing apparatus, comprising:
a light-blocking object processing section configured to produce
- a first light-blocking object that is as an underlayer of a first image object formed on a front of a medium, the first light-blocking object being in a first area between the first image object and the medium, and
- a second light-blocking object which is formed as an underlayer of a second image object formed on a rear surface of the medium, the second light-blocking object being in a second area between the second image object and the medium; and an overlapping area determining section configured to determine
- an overlapping area in which the first area and the second area overlap each other with the medium between the first area and the second area, and
- a third area in which the first area and the second area are formed but do not overlap each other, wherein the light-blocking object processing section produces the first light-blocking object and the second light-blocking object so that a thickness of one of the first light-blocking object and the second light-blocking object is smaller in the overlapping area than in the third area.

* * * * *